(12) United States Patent
Truax

(10) Patent No.: US 6,752,094 B1
(45) Date of Patent: Jun. 22, 2004

(54) SEED PLANTER

(76) Inventor: James R. Truax, 3717 Vera Cruz Ave. North, Minneapolis, MN (US) 55422

(*) Notice: Subject to any disclaimer, the term of this patent is extended or adjusted under 35 U.S.C. 154(b) by 26 days.

(21) Appl. No.: 10/359,797

(22) Filed: Feb. 7, 2003

Related U.S. Application Data

(60) Provisional application No. 60/360,268, filed on Feb. 27, 2002.

(51) Int. Cl.[7] .......................... A01C 5/00; A01B 15/16; A01B 23/06
(52) U.S. Cl. .......................... 111/135; 111/69; 111/167; 111/200
(58) Field of Search .......................... 111/135, 69, 167, 111/200, 18, 52, 62, 134, 136, 149, 157, 163; 172/558, 518

(56) References Cited

U.S. PATENT DOCUMENTS

| | | |
|---|---|---|
| 4,030,428 A | 6/1977 | Truax |
| 4,977,841 A | 12/1990 | Truax |
| 5,279,236 A | 1/1994 | Truax |

*Primary Examiner*—Christopher J. Novosad
(74) *Attorney, Agent, or Firm*—Gray, Plant, Mooty, Mooty & Bennett, P.A.

(57) ABSTRACT

A no-till seed planter includes a wheel mounted frame having at least one rock shaft carrying a rank of seed planting assemblies connected to the rock shaft by torque arms. A torsion joint connects each torque arm to the rock shaft and permits resilient rotation of the torque arm on the rock shaft. A stop block assembly on the rock shaft limits the amount of permissible rotation of the torsion joint on the rock shaft in order to avoid damage to the torsion joint and dislocation of the torsion joint. The torque arm is a composite structure of a main member connected to the torsion joint at one end and to a planter assembly at the other. In one embodiment leaf members are connected to the torsion joint and extend alongside the main member to an intermediate location on it. The leaf members buffer side-to-side deflection of the main member. The planter assembly includes a furrowing disk and a depth gauge tire spaced from the disk. A flexible boot extends from the tire toward the disk with an outer edge that can make surface contact with the side surface of the disk in order to prevent a dirt accumulation on it. The outer edge is prone to wear. The tire is mounted on a laterally adjustable axle to permit adjustment of the space between the tire and the side of the disk in order to compensate for wear on the edge of the boot.

33 Claims, 18 Drawing Sheets

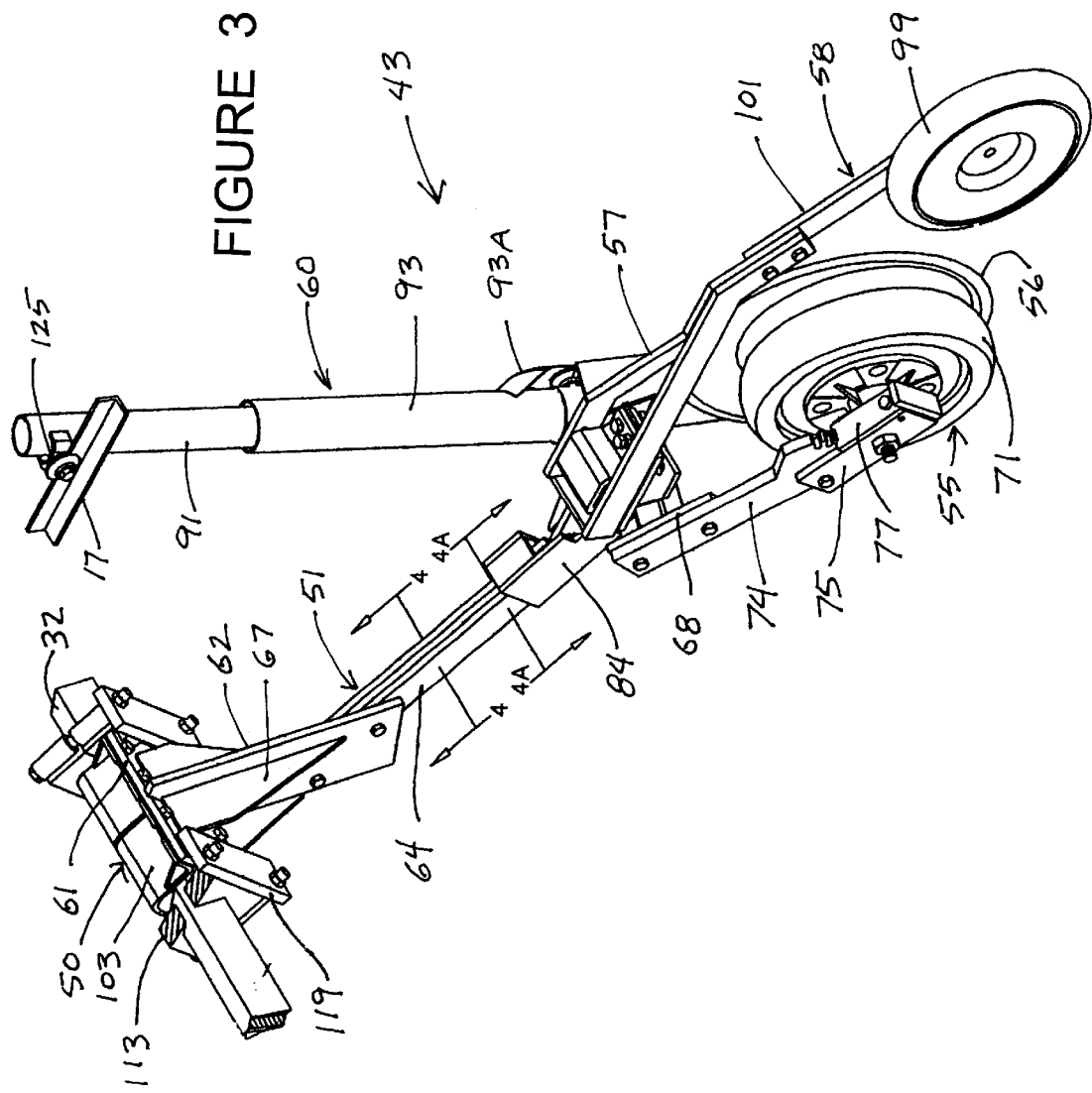

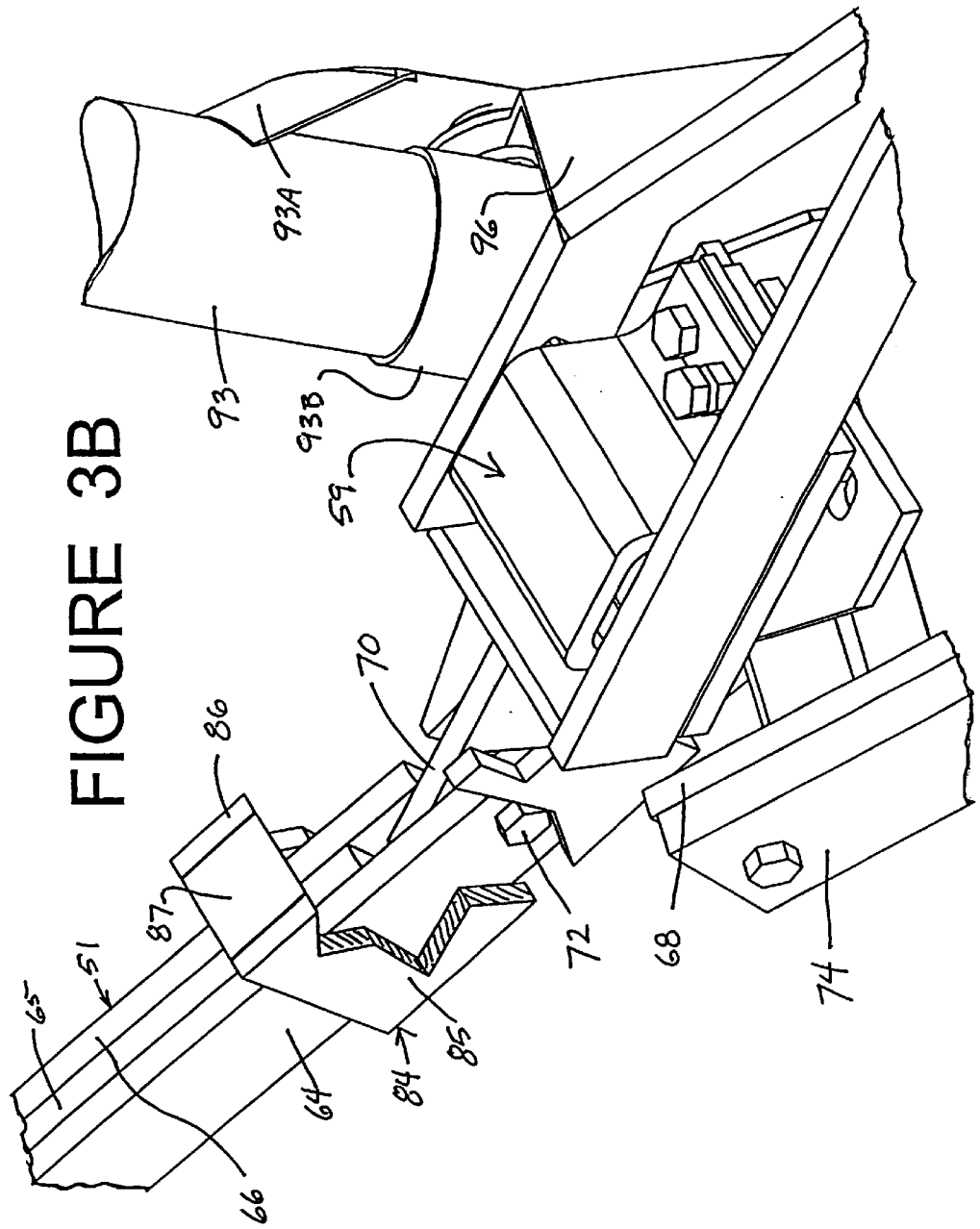

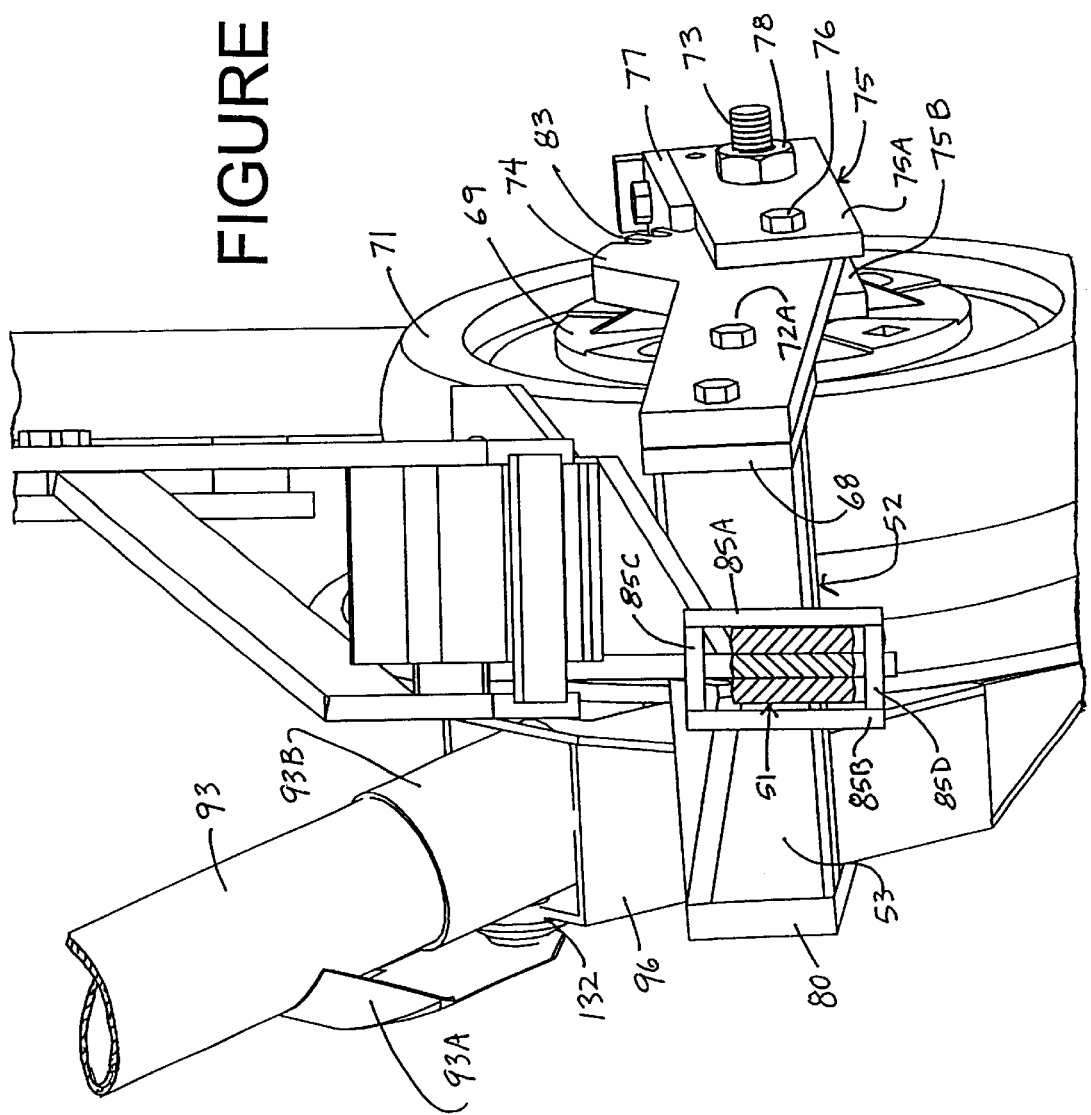

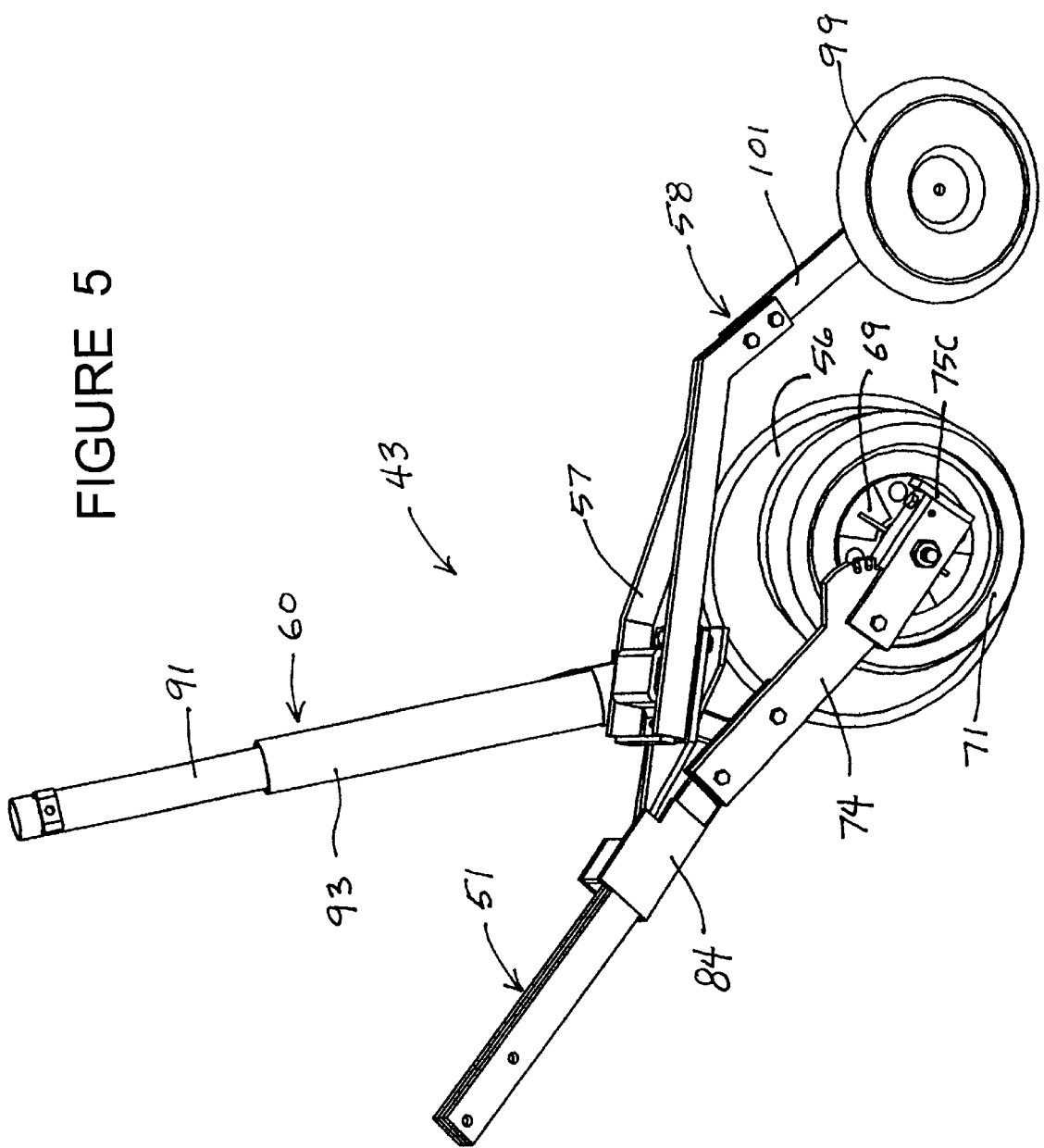

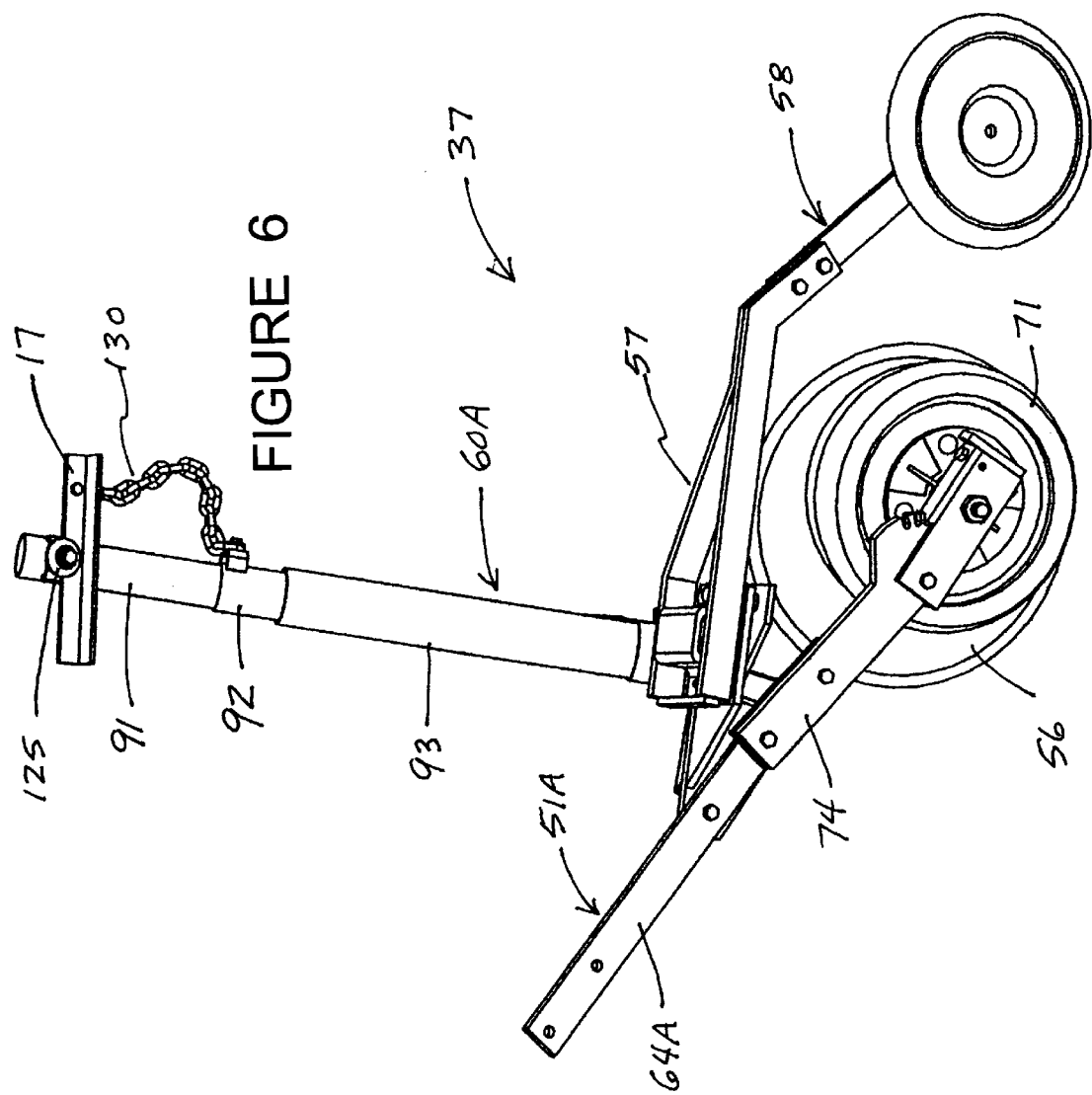

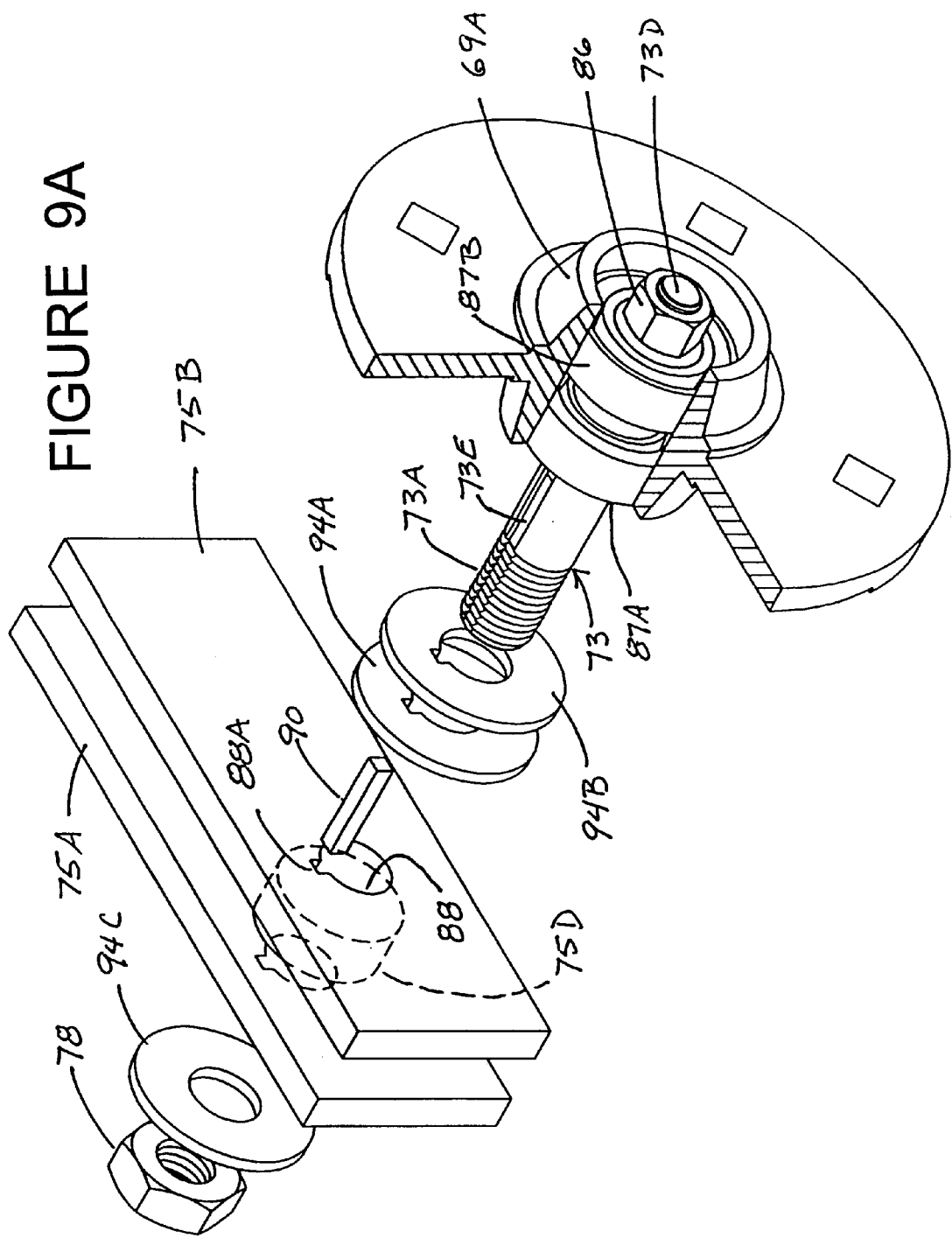

SEED PLANTER

CROSS REFERENCE TO RELATED APPLICATION

This application claims the benefit of U.S. Provisional Patent Application Serial No. 60/360,268 filed Feb. 27, 2000.

BACKGROUND OF THE INVENTION

No-till planting is popular for several reasons. No till planting causes minimal soil disturbance and places the seed in optimal soil-to-seed contact for quicker germination. Other factors include weed control, reduced soil erosion, greater moisture control, and a reduction of fuel costs. The use of no-till planting equipment has increased the amount of acreage available for planting. No-till planting is employed over rugged, irregular terrain, such as hilly fields and highway rights of way.

The no-till planter must be sturdy enough to operate under adverse soil conditions and cut through any previous crop residue. The no-till planter must provide a narrow band of tillage to receive the seed. Accurate control of the planting depth is required, according to soil condition, moisture content and type of seed. The individual planter assemblies on the planter must have the ability to individually negotiate high hills and deep holes, and to withstand side-to-side deflection forces.

A seed drill of the prior art includes a wheel mounted frame for towing behind a tractor. The frame carries one or two ranks of planter assemblies. Each rank is mounted on a transverse mounting bar or rock shaft connected to the frame. See U.S. Pat. No. 4,030,428 issued Jun. 21, 1977 to Truax. Each planter assembly is connected to the rock shaft by a torsion joint and a torque arm connected to the torsion joint. The torsion joint includes a generally square housing that surrounds the shaft, and resilient torsion spring elements positioned in the interior corners of the housing bearing against a flat surface of the rock shaft for compression upon rotation of the planter assembly with respect to the rock shaft. See U.S. Pat. No. 4,977,841 issued Dec. 18, 1990 to Truax.

During operation, the individual planter assemblies can experience considerable up and down movement. Extreme rotational movement of the torsion joint on the rock shaft has a tendency to dislodge or move the torsion joint housing to an over-center position on the rock shaft. If a planter assembly is maintained for any period of time in a position rotated with respect to the mounting bar, as in storage or during transport, there is a tendency for the torsion elements to "set" or assume a permanent deformation. For these reasons structure to limit permissible rotation of the torsion joint on the rock shaft is desirable.

The rugged terrain traversed by the no-till planter subjects the mounting beam structure connecting the planter equipment to the main machine frame to considerable side-to-side flexure forces, or horizontal forces. It is necessary to permit some amount of flexure to avoid damage to the machine. However, the mounting structure needs to be strong enough to endure such flexure without damage, yet have substantial resiliency to return the planter equipment to the proper operating location.

On such machines, a seed tube connects the seed hopper to a seed drop or planting shoe that is typically located closely adjacent a furrow opening disk and just behind the working edge that opens a furrow. Up and down movement of the planting equipment over the irregular terrain causes a continuous variation in the distance between the seed hopper and the seed shoe. The seed tube must be sturdy enough to withstand the rigors of a no-till planting environment, yet flexible in length to accommodate the continuously changing distance between the seed hopper and the seed shoe.

Such machines also typically include a depth gauge wheel to regulate depth penetration of the furrowing disk. The wheel is mounted close to the disk and aligned with it. A rubber boot extends from the tire of the depth gauge wheel toward the furrowing disk. The outboard edge of the boot is either spaced slightly from the side of the disk, or is in light surface contact with it. The purpose of the boot is to prevent an accumulation of moist dirt on the side of the disk, which could otherwise inhibit penetration of the disk into the soil. Through wear on the edge of the boot, the gap between the boot and the side of the disk can widen to an unacceptable width. Prior art machines have no ability to compensate for such widening of this gap.

SUMMARY OF THE INVENTION

The invention relates to a seed drill or planter for no-till planting. The seed drill includes a wheel mounted frame having one or more transverse rock shafts, each carrying a rank of seed planter assemblies. The planter assemblies are of the type having a torsion joint connected to the rock shaft; a mounting beam or torque arm connected at one end to the torsion joint and at the other end to planting equipment; planting equipment including a depth gauge wheel-furrowing disk combination connected to the other end of the torque arm; and a seed tube extending from a top end proximate a seed hopper, to a location proximate a furrowing disk at the lower end.

The rock shaft has a generally square cross-section shape. The torsion joint is the type having a box like housing that is mounted diagonally on the rock shaft. Spaces formed by interior corners of the housing and the flat sides of the rock shaft are each filled with a bar-like torsion spring element. The torsion spring element bears against the interior corner of the housing and against one of the flat sides of the rock shaft. Rotational movement of the housing relative to the rock shaft results in a return moment produced by deformation of the torsion spring elements.

The planter assemblies have the capacity for a large range of up and down movement relative to the rock shaft by virtue of the torsion joint. Extreme rotation of the torsion joint on the rock shaft tends to dislodge the torsion joint housing on the rock shaft by moving the housing to an over-center position on the shaft. A stop block assembly is provided in order to limit the permissible range of rotation of the torsion joint on the rock shaft. The torsion joint housing includes one side wall comprised as a mounting plate connected to the torque arm. The stop block assembly is assembled to the rock shaft next to the torsion joint housing. The stop block assembly rotates with the rock shaft and includes a stop plate that overlaps with the mounting plate of the torsion joint housing. The stop plate intercepts rotational movement of the torsion joint housing beyond a preselected rotational limit relative to the rock shaft. This not only prevents the torsion joint housing from becoming dislodged on the rock shaft, it prevents the torsion spring elements from acquiring a permanent set as a result of being maintained in an overly deflected configuration.

Torque arms connect the planter equipment to the main machine frame. Certain of the torque arms have a leaf-spring assembly. The torque arms so allow a permissible degree of side-to-side flexure of the planter equipment and bias the equipment toward an undeflected position.

A planter according to the invention can include a seed tube comprised of two or three telescoping sections enabling extension and retraction of the seed tube as may be required according to the terrain being traversed by the associated planter equipment. The first or upper tubular section is fastened to the overall machine frame near the seed bins and is positioned near a seed funnel extending from one or more of the seed bins. The lower section is connected to a frame or yoke carrying the planter equipment. The lower section empties to a seed drop shoe next to the furrowing disk to deposit seed in the seed slot formed by the disk. The seed tube can include an intermediate section connected by a flexible link or tether to the machine frame and telescopically engaging both the upper and lower sections.

A planter assembly according to the invention can also include a depth gauge wheel and furrowing disk combination wherein the lateral distance is adjustable between the side of the depth gauge tire and the side surface of the furrowing disk. A forked yoke is connected to the end of the planter assembly torque arm. One leg of the yoke carries a hub that mounts the furrowing disk. The other leg of the yoke carries a depth gauge wheel assembly that includes another hub that mounts a depth gauge tire parallel to the furrowing disk. The tire is positioned to ride on the soil surface next to the furrowing disk and regulate the depth of penetration of the disk into the soil. A boot extends from the side of the tire to a location with the outboard edge of the boot closely proximate or in light surface contact with the facing surface of the disk. The purpose of the boot is to prevent an accumulation of moist soil on the surface of the disk. As the planter assembly traverses the ground, the boot edge continuously moves into and out of contact with the side surface of the furrowing disk. Eventually the edge of the boot wears away, enlarging a gap between the boot edge and the disk surface. The depth gauge wheel is mounted on a movable axle that is laterally adjustable whereby the distance between the tire and the disk is adjustable. When the boot edge wears away, the tire is adjusted so as to be closer to the disk in order to close the gap whereby the boot again functions properly.

IN THE DRAWINGS

FIG. 3 is a perspective view of one of the planter assemblies of the machine of FIG. 2 mounted on a rock shaft with a stop block assembly shown partly in section;

FIG. 3B is an enlarged view of a portion of the planter assembly of FIG. 3 showing the lower end of the torque arm connecting planting equipment to the main frame of the machine;

FIG. 4A is an enlarged sectional view of another portion of the planter shown in FIG. 3 taken along the line 4A—4A thereof;

FIG. 5 is a perspective view of the planter assembly of FIG. 3 removed from the rock shaft;

FIG. 6 is a perspective view similar to that of FIG. 5 but showing a planter assembly of the forward rank of planter assemblies;

FIG. 9A is an exploded view of the axle assembly of the depth gauge wheel shown is FIG. 9;

DESCRIPTION OF A PREFERRED EMBODIMENT

Figure 1:
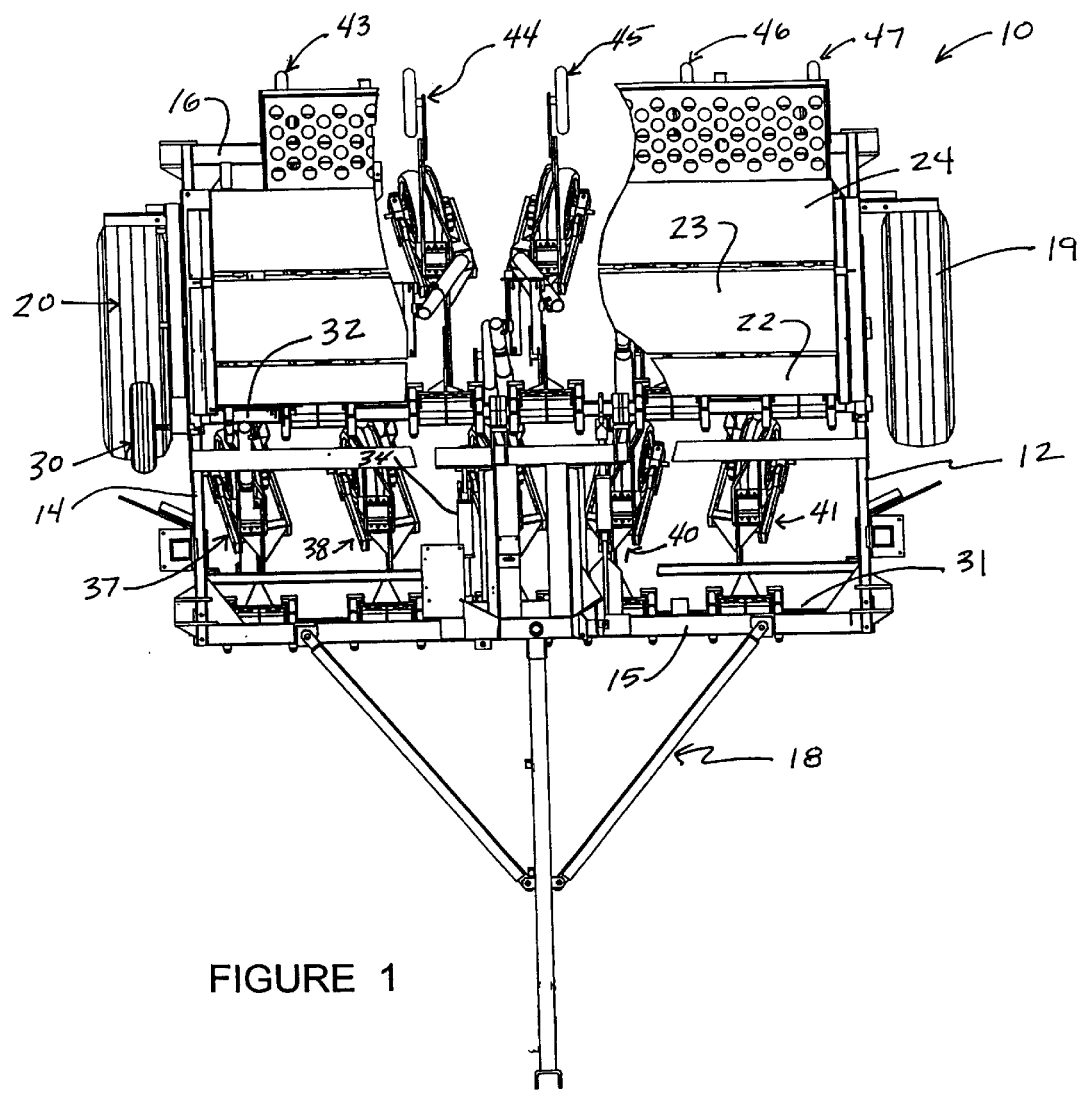
FIG. 1 is a top plan view of a no-till planter according to the invention with portions shown broken away for purposes of illustration.
Figure 2:
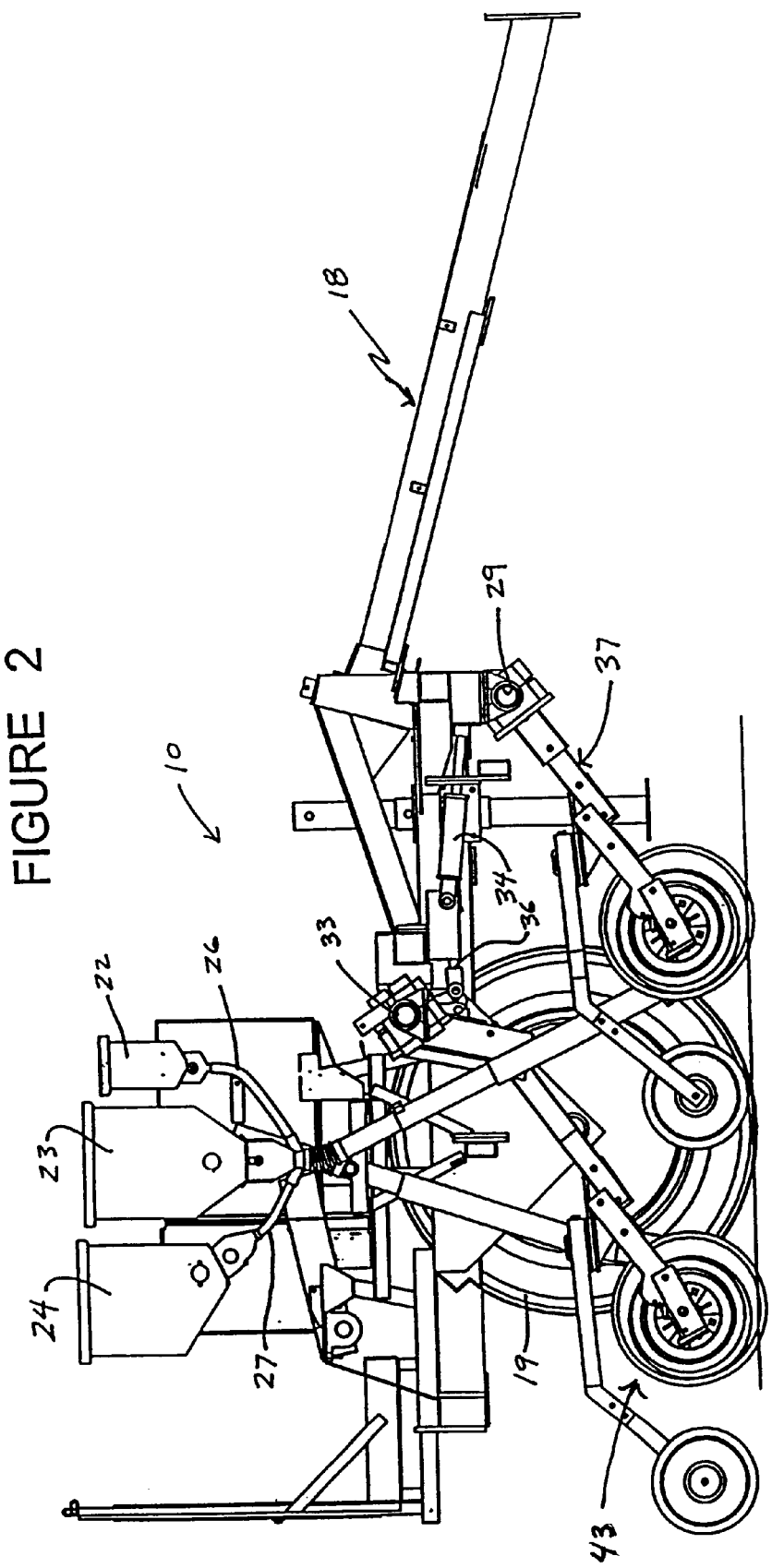
FIG. 2 is a side elevational view of the planter of FIG. 1 with portions broken away and parts removed for purposes of clarity.

Referring to the drawings, there is shown in FIGS. 1 and 2 a seed planter machine according to the invention indicated generally at 10. Machine 10 has a main frame 11 that includes side frame members 12, 14, a front frame member 15 and a rear frame member 16. Frame 11 is carried by wheels 19, 20 mounted on the side frame members. A tongue and hitch assembly 18 is connected to frame 11 for towing.

A plurality of seed boxes 22, 23, 24 are mounted on frame 11. Seed distribution hoses 26, 27 extend from the seed boxes to seed funnels 28. The number of seed funnels 28 corresponds to the number of planter assemblies to be described. The seed boxes contain seed picker apparatus (not shown) (for example see U.S. Pat. No. 4,030,428 to Truax) to move seed from the box to the seed hoses. The seed hoses are connected to seed tubes as will be described. The picker apparatus is operated by a drive wheel 30 that is rotated through frictional engagement with one of the frame wheels 20.

A forward rock shaft 31 is mounted laterally across frame 11 near the forward end thereof. Forward rock shaft 31 is connected by suitable bearing structure 29 to side frame members 12, 14. Forward rock shaft 31 carries a forward rank of planter assemblies 37–41 as will be described. An aft rock shaft 32 is mounted laterally across frame 11 at a location spaced longitudinally rearward of forward rock shaft 31 and is connected to side frame members 12, 14 by suitable bearing structure 33. Aft rock shaft 32 carries an aft rank of planter assemblies 43–47. Each rock shaft is carried by frame 11 for limited rotational movement thereon. A first hydraulic piston-cylinder motor 34 is connected between frame 11 and an offset connection to forward rock shaft 31 for purposes of rotating rock shaft 31. In like fashion, a second hydraulic piston-cylinder motor 36 is connected between frame 11 and an offset connection to aft rock shaft 32 for purposes of rotating it.

A typical planter assembly 43 from the rear rank of planter assemblies is shown connected to the rock shaft 32 in FIG.

3 and apart from the rock shaft in FIG. 5. Planter assembly 43 includes a torsion joint 50 connecting it to the rock shaft 32. A torque arm 51 is connected at one end to the torsion joint 50. The other end of torque arm 51 is connected to a yoke 52 (FIG. 4A) having first and second substantially parallel, spaced apart legs 68, 80 connected by cross member 53. A first leg 68 of yoke 52 carries a depth gauge wheel assembly 55. The second leg 80 carries a furrowing disk 56.

A press wheel beam 57 is connected at a forked, fixed end to a torsion knuckle assembly 59 fixed to the cross member 53 of yoke 52. The opposite end of press wheel beam 57 is connected to a press wheel assembly 58.

Torque arm 51 is substantially inflexible in a vertical plane, or in an up and down direction. The arm is flexible side-to-side in order to permit limited sideways deflection of the planter equipment when hitting an obstacle, and provide a spring force tending to return the planter equipment to the undeflected position.

Figure 10:
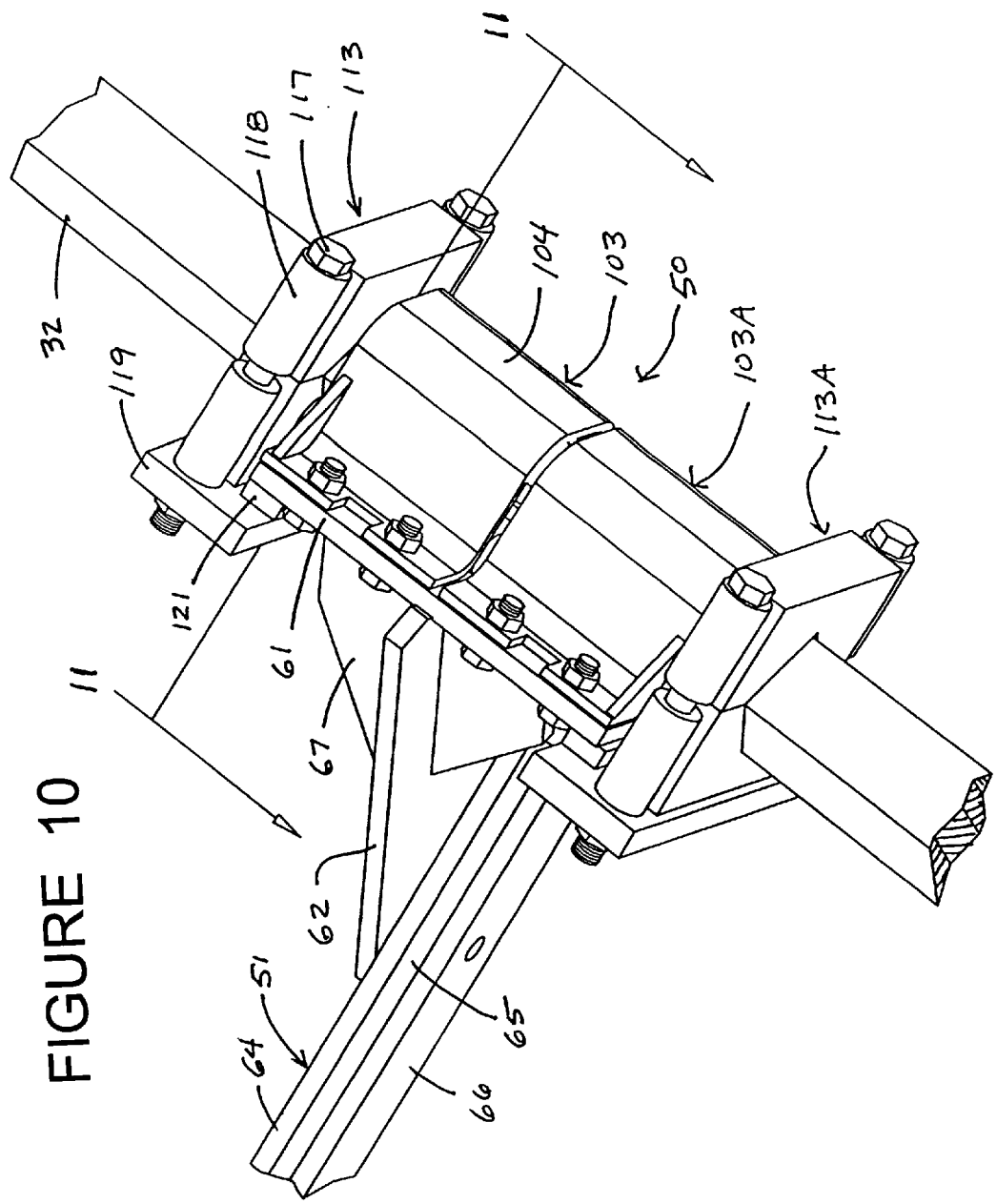
FIG. 10 is an enlarged view of a torsion joint assembly that assembles a planter to a rock shaft.

Torsion joint 50 includes a mounting plate 61. A bracket 62 reinforced by several gussets 67 is fixed to the mounting plate 61 as by welding (see FIGS. 10 and 11). Torque arm 51 includes a main member 64 fixed at the upper end to the bracket 62 and at the lower end to the yoke 52. As shown the lower end of main member 64 is attached by a bolt 72 to a plate 70 extending from the cross member 53 (FIG. 3B).

Torque arm 51 also includes a pair of leaf members 65, 66. Leaf members 65, 66 are fixed at upper ends to the bracket 62 adjacent the upper end of main member 64. Leaf members 65, 66 extend along the length of main member 64 and terminate at free ends at an intermediate location along the length thereof. Main member 64 and leaf members 65, 66 are spring steel or the like and form a leaf spring like structure buffering side-to-side deflection.

An open ended box like housing 84 encompasses the lower ends of main torque arm member 64 and the leaf members 65, 66. The purpose of housing 84 is to hold the lower ends of leaf members to the main member and constrain them for side-to-side deflection together. When so constrained the members act together to exert a return force upon sideways deflection of the torque arm.

Housing 84 closely straddles the lower end of torque arm 51. A first side wall 85A of housing 84 lies closely adjacent the main member 64. The end of first side wall 85A can abut a part of yoke 52 for support. A second side wall 85B is located adjacent the outside leaf member 66. A top wall 85C and a bottom wall 85D connect the side walls 85A,B of housing 84.

The first leg 68 of yoke 52 carries the depth gauge wheel assembly 55. The depth gauge wheel assembly includes a hub and rim 69 conventionally assembled to a tire 71. The hub 69 is carried by an axle assembly including an axle 73. A detent mechanism as shown in FIGS. 3, 4A and 5, permits up and down adjustment of the level of tire 71. Tire 71 is adjustable up and down by up and down adjustment of the axle 73. First leg 68 of yoke 52 is attached by bolts 72 to an adjustment or detent plate 74. The opposite end of adjustment plate 74 has an arc-shaped array of spaced apart fingers or projections 83. Hub 69 is connected through axle 73 to an axle support plate structure indicated generally at 75. Axle support structure 75 has outside and inside side plates 75A, 75B and a back member 75C straddling adjustment plate 74 and pivotally connected to it by a bolt 76. Side plates 75A, 75B support a lock or detent member 77. Lock member 77 is positioned to lodge between adjacent fingers on the end of the adjustment plate 74. Positional adjustment is accomplished by removal of nut 78 to permit separation of adjustment plate 74 from the support plate structure 75. The lock member 77 is positioned in the desired slot or space between the fingers 83 on the end of adjustment plate 74. The mounting nut 78 is replaced to lock the key in place and to secure the desired elevational position of tire 71 on leg 68.

Figure 8:
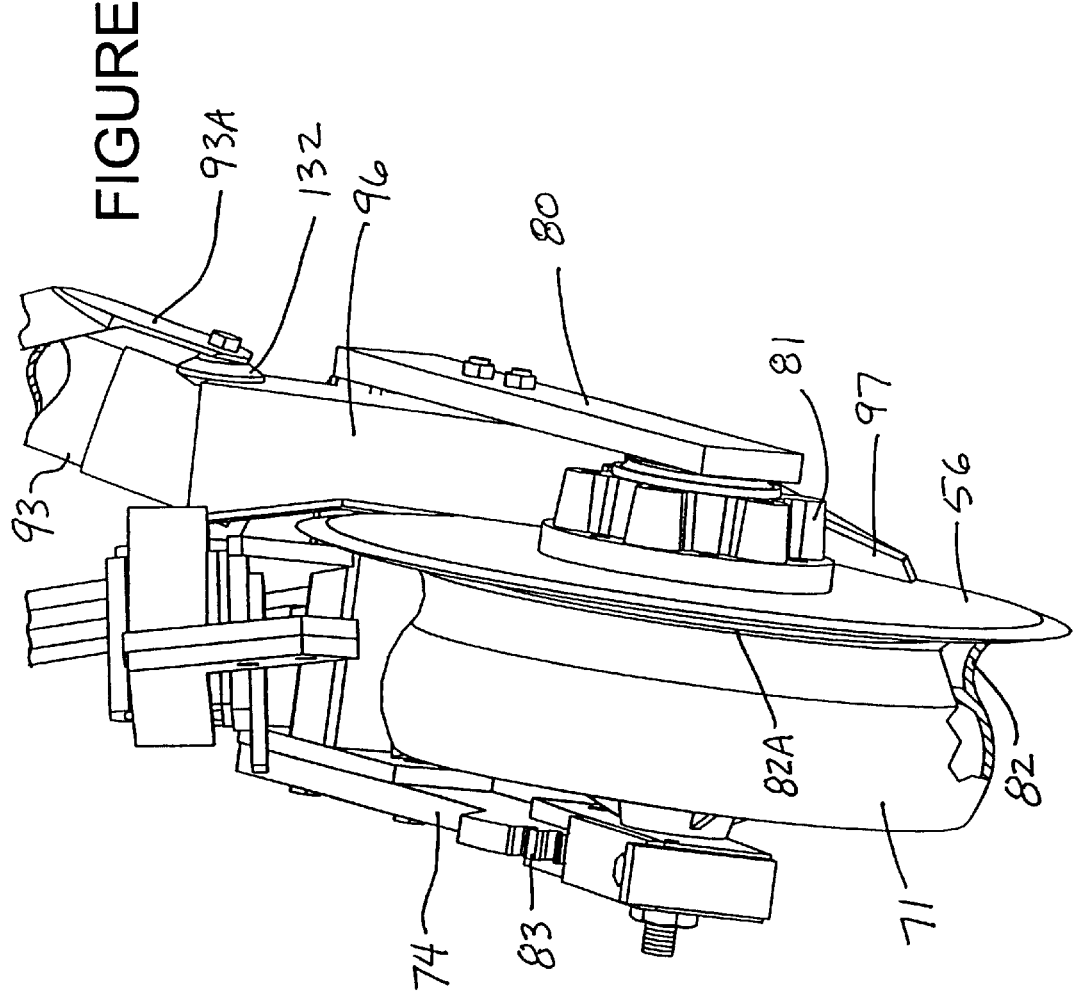
FIG. 8 is a front view of the planting equipment of FIG. 7 with the press wheel removed for purposes of clarity.

Second yoke leg 80 is connected to a hub 81 that mounts the furrowing disk 56. As shown in FIG. 8, disk 56 is positioned by second leg 80 parallel to the depth gauge tire 71. The soil penetration depth of disk 56 is regulated by engagement of the tire 71 with the soil surface. Adjustment of the elevation of tire 71 as described above, regulates the penetration depth of disk 56.

Also shown in FIG. 8, a flexible boot 82 is attached to the side of tire 71 and extends to the side surface of the disk 56. Boot 82 is a sleeve of flexible rubber or equivalent material. The outboard edge 82A of boot 82 is preferably spaced very closely to or in light surface contact with the side surface of disk 56. The purpose of boot 82 is to prevent an accumulation of moist soil on the side of the disk 56 which might inhibit penetration of disk 56 into the soil surface.

A problem can arise with respect to the outboard edge 82A of the boot. The tire 71 and disk 56 rotate at different velocities. As the machine traverses irregular terrain, the edge of the boot is continuously in and out of contact with the side surface of the disk. Eventually the edge wears away, creating a gap increasing in size between the boot and the disk. The continuously enlarging gap can eventually permit a significant accumulation of moist dirt on the side of the disk. This compromises the operation of the furrowing disk.

The machine of the present invention addresses this problem through the provision of a laterally adjustable axle to regulate the spacing between the depth gauge tire and the disk. The spacing is variable in order to permit compensation for the enlarged gap created with wear of the boot edge. This accommodation is provided by means for adjusting the in-and-out axle position. One mechanism for this is shown in FIGS. 9 and 9A.

Figure 9:
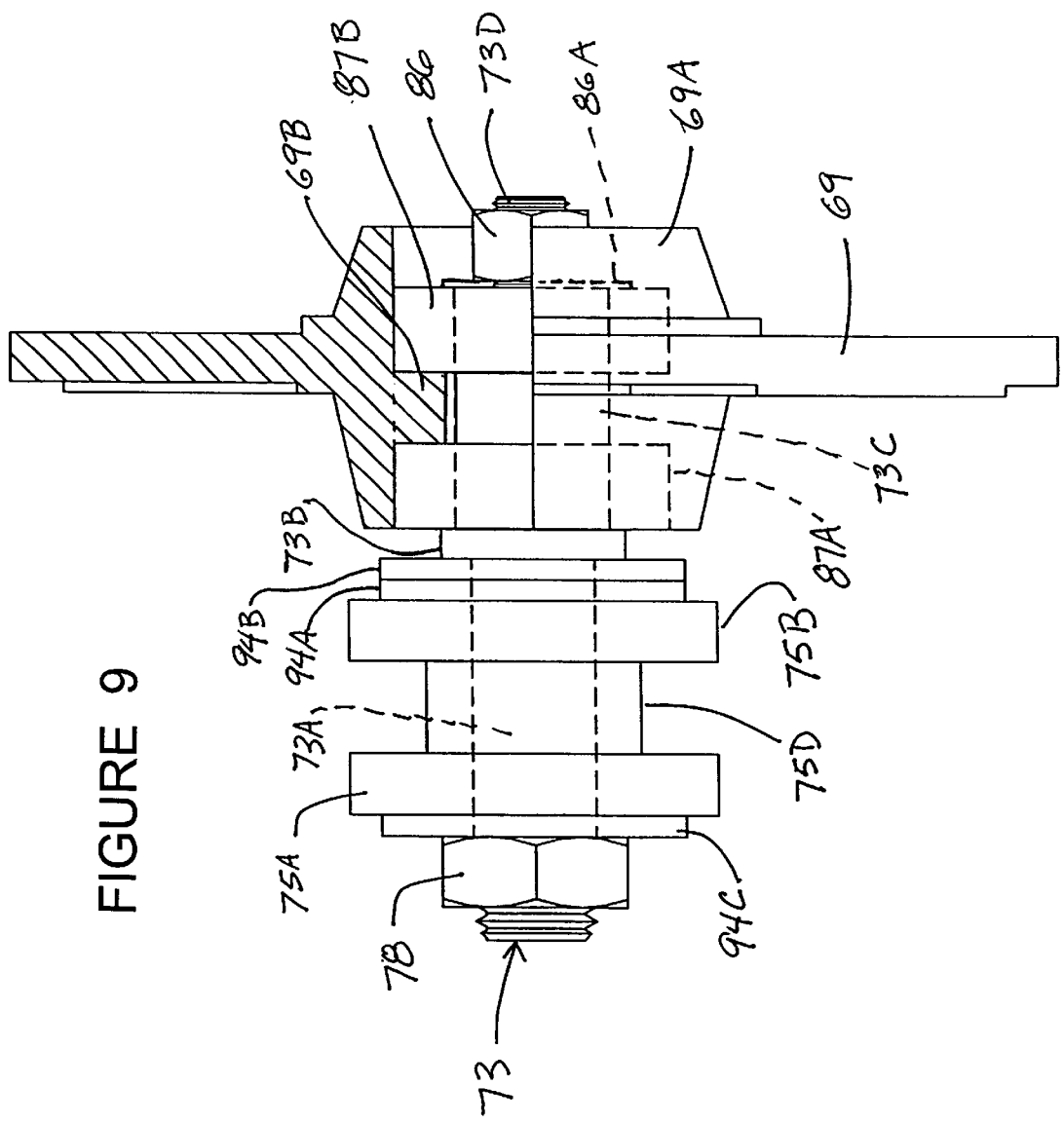
FIG. 9 is a view partly in section of a portion of the planter equipment of FIG. 8 showing one embodiment of the axle assembly of the depth gauge wheel.

FIG. 9 is a view partly in section showing the axle assembly of the depth gauge wheel with the tire and other parts removed for purposes of clarity. FIG. 9A is an exploded view of the axle assembly of FIG. 9.

Axle 73 has an outboard section 73A with a threaded end that holds an outboard retaining nut 78. Outboard section 73A ends at an intermediate shoulder 73B. An inboard section 73C extends from the shoulder 73B. The shoulder 73B has a diameter larger than the inboard or outboard sections. The inboard section 73C ends at a threaded inboard end 73D which carries an inboard retaining nut 86 bearing against a washer 86A.

Tire hub 69 has an enlarged centrally open housing 69A. Inboard and outboard wheel bearings 87A, 87B are positioned in the housing 69A. The outboard bearing 87A bears between the shoulder 73B of shaft 73 on one side, and an interior shoulder 69B of housing 69A on the other. Inboard bearing 87B bears against washer 86A on one side and the interior shoulder 69B on the other. Wheel bearings 87A, 87B can be of conventional construction, each having an outer race that rotates with the hub 69; an inner race that rotates with the axle 73; and roller bearing elements between the races.

Axle 73 can carry spacers that can be added or removed to laterally adjust the in-and-out position of the hub 69 and accordingly tire 71 with respect to the side surface of the disk 56. As shown in FIGS. 9 and 9A axle 73 carries two spacers 94A, 94B. The spacers are located between the side surface of the inside side plate 75B of axle support 75 and the shoulder 73B of axle 73. As shown in FIG. 9A the side plates 75A, 75B have axle openings 88 with key slots 88A. A bushing 75D is located between the side plates. Spacers 94A, 94B have key slots. Axle 73 also has a corresponding key slot 73E along its outside end. A key 90 fits in the respective key slots to secure the axle with respect to the axle support 75 as well as secure the spacers on the axle. It can be seen that adding spacers 94 at a position between the axle support 75 and the axle shoulder 73B moves the hub outward in a direction toward the disk 56. This is done as may be necessary to compensate for an enlarged gap between the outboard edge of the tire boot 82 and the side surface of the disk 56. One or more spare spacers 94C can be carried as washers next to the axle nut 78.

Figure 9B:
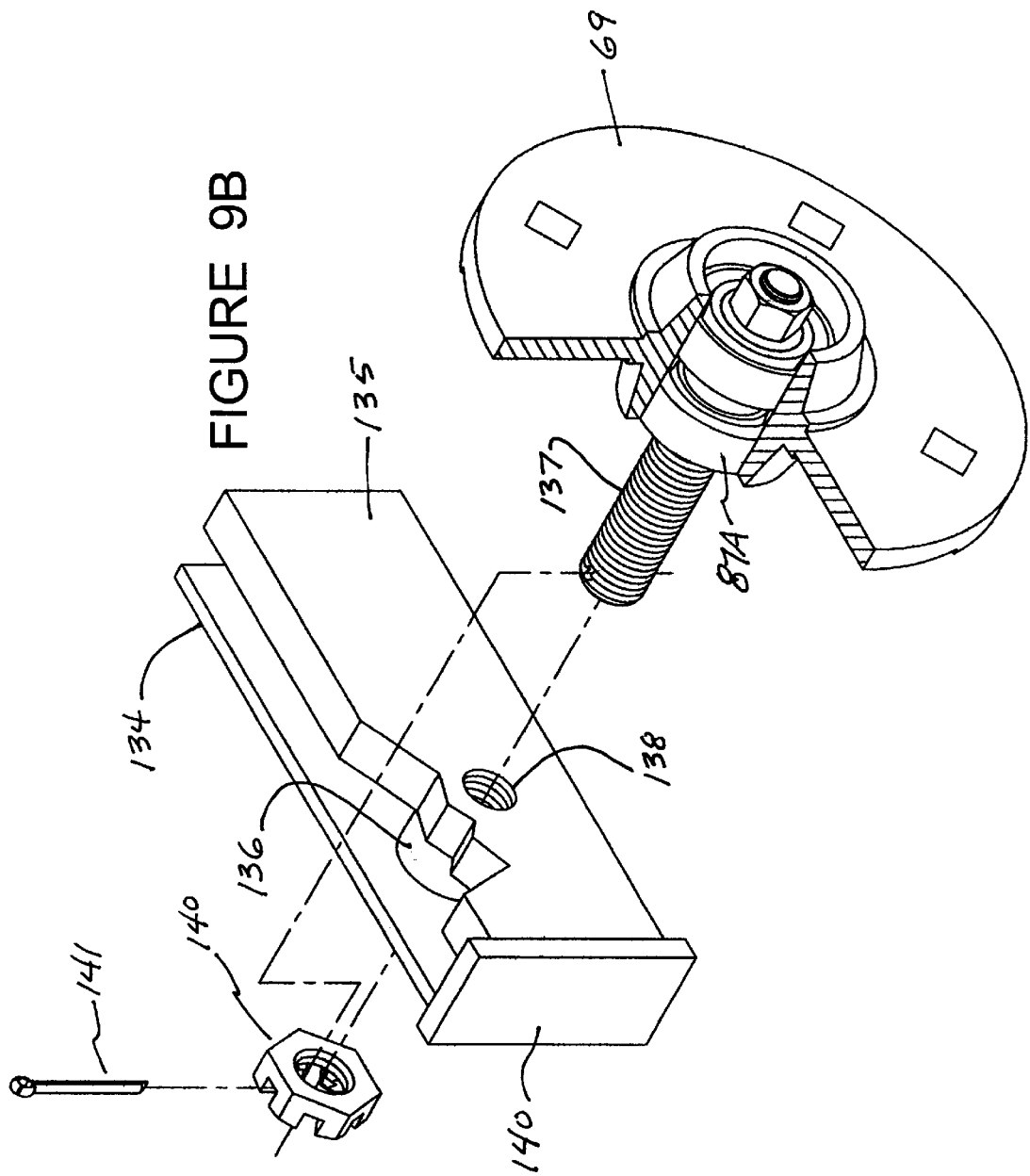
FIG. 9B is an exploded view like that of FIG. 9A showing a modification thereof.

FIG. 9B shows a second mechanism for adjusting the in-and-out axle position in order to close the gap between the outboard edge of the boot and the side surface of the disk 56. Tire hub 69 is connected to an axle 137. Axle 137 is threaded over its length outboard of the outboard bearing 87A. An axle support structure includes outside and inside side plates 134, 135 and an end plate 140 that function as previously described. Inside side plate 135 has a threaded opening 138. Outside side plate 134 has a corresponding unthreaded opening. A bushing 136 separates the side plates. A lock nut 140 securable by a cotter pin 141 can be engaged with the outer end of axle 137. In use axle 137 is threaded into opening 138 a distance to place hub 69 in the desired location. Axle 137 is locked in position using lock nut 140. One or more spacers or washers such as the spacers 94 can be placed between lock nut 140 and the facing surface of outside side plate 134 to further tighten the axle 137 in the selected position. Hub 69 is moved simply by loosening the lock nut 140 and adjusting the axle 137.

Figure 2A:
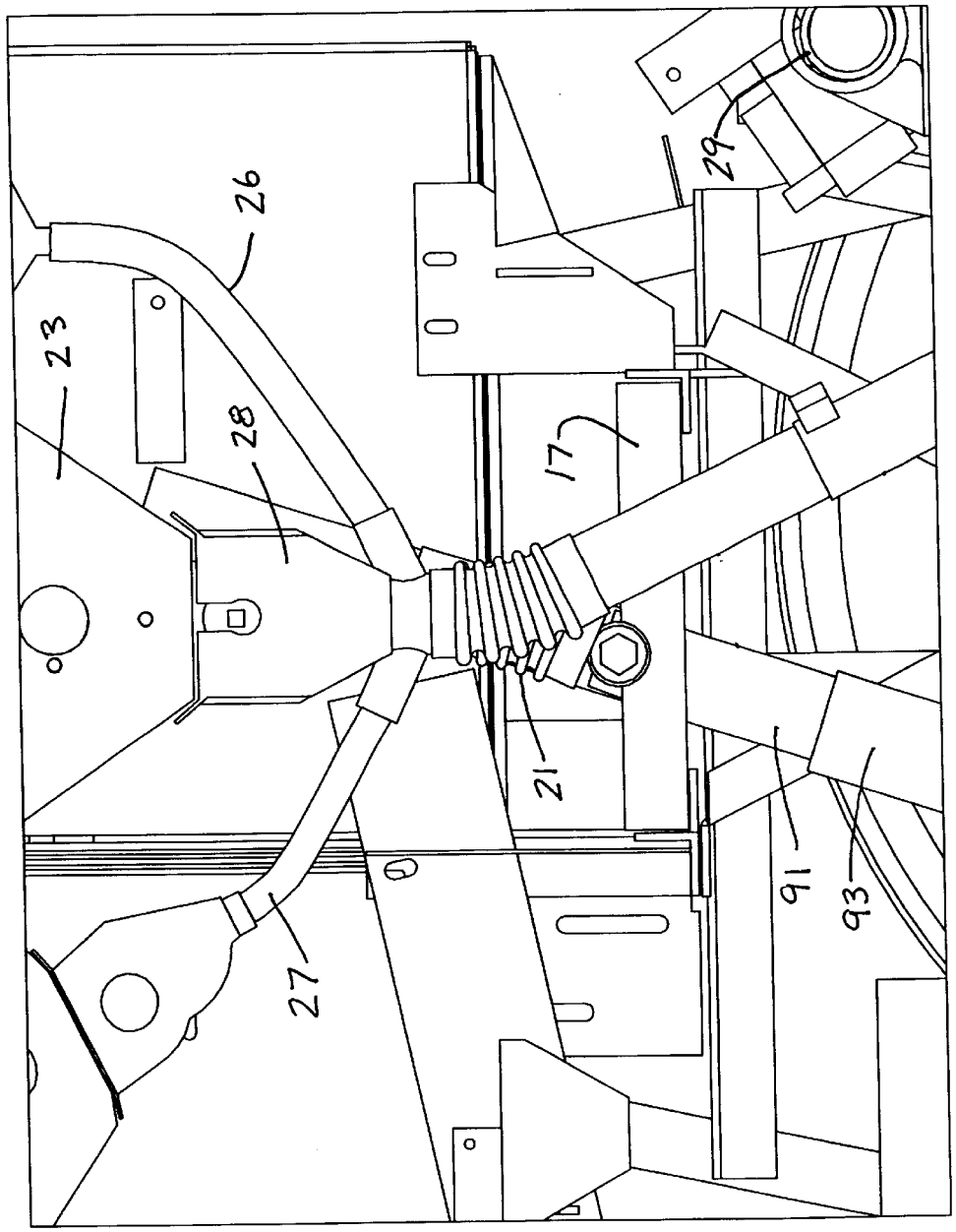
FIG. 2A is an enlarged view of part of the planter shown in FIG. 2 showing more clearly the seed hoses, seed funnels and the upper ends of seed tubes.
Figure 3A:
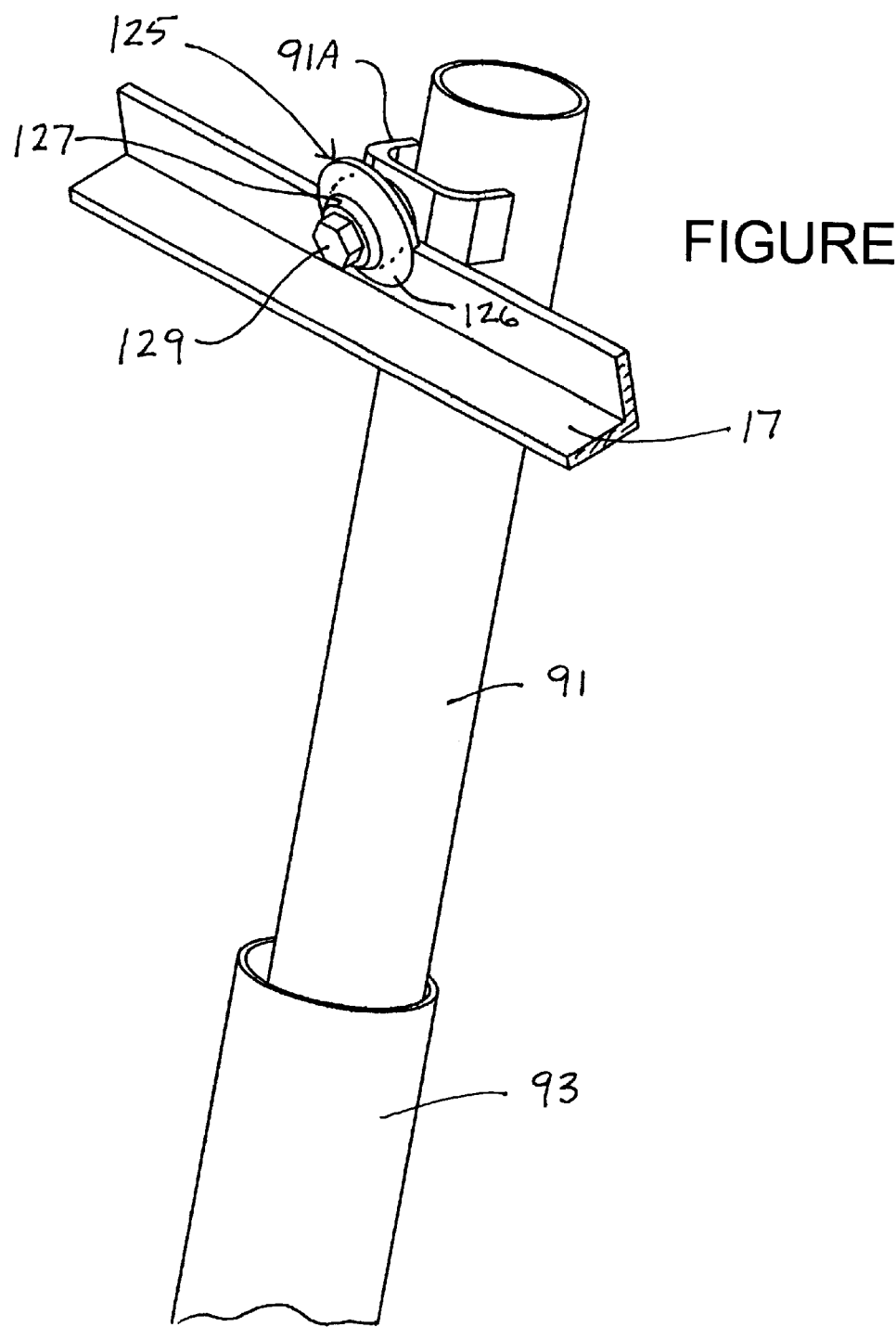
FIG. 3A is an enlarged view of a portion of the planter assembly of FIG. 3 showing the connection of the upper section of the seed tube to the machine frame.
Figure 4:
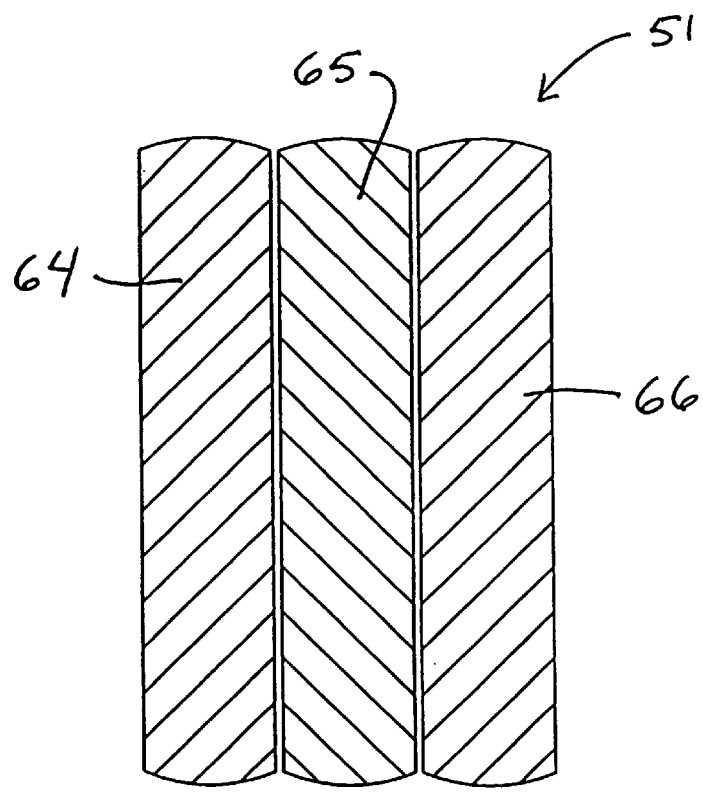
FIG. 4 is an enlarged sectional view of a section of the torque arm of the planter assembly of FIG. 3 taken along the line 4—4 thereof.

FIGS. 3 and 5 show a seed tube 60 associated with planter assembly 43, having two telescoping sections. An upper section 91 telescopes into a lower section 93. The sections have connector brackets 91A and 93A respectively. As shown in FIGS. 2A and 3A the upper section 91 is rotatably connected to a main frame member 17 near a seed funnel 28. A corrugated hose section 21 is connected to the top of the upper seed tube section 91 and to the seed funnel 28.

As shown in FIG. 3A, a universal swivel connector 125 connects the seed tube connector 91A to the frame member 17. Swivel connector 125 includes a swivel ball socket mount 126 that is fastened as by welding to frame member 17. A swivel ball 127 is mounted in the socket mount 126. A bolt 129 passes through the swivel ball 127 and is threaded into the connector bracket 91A on the upper seed tube section 91. Swivel connector 125 permits pivotal movement of the upper seed tube section 91.

Figure 7:
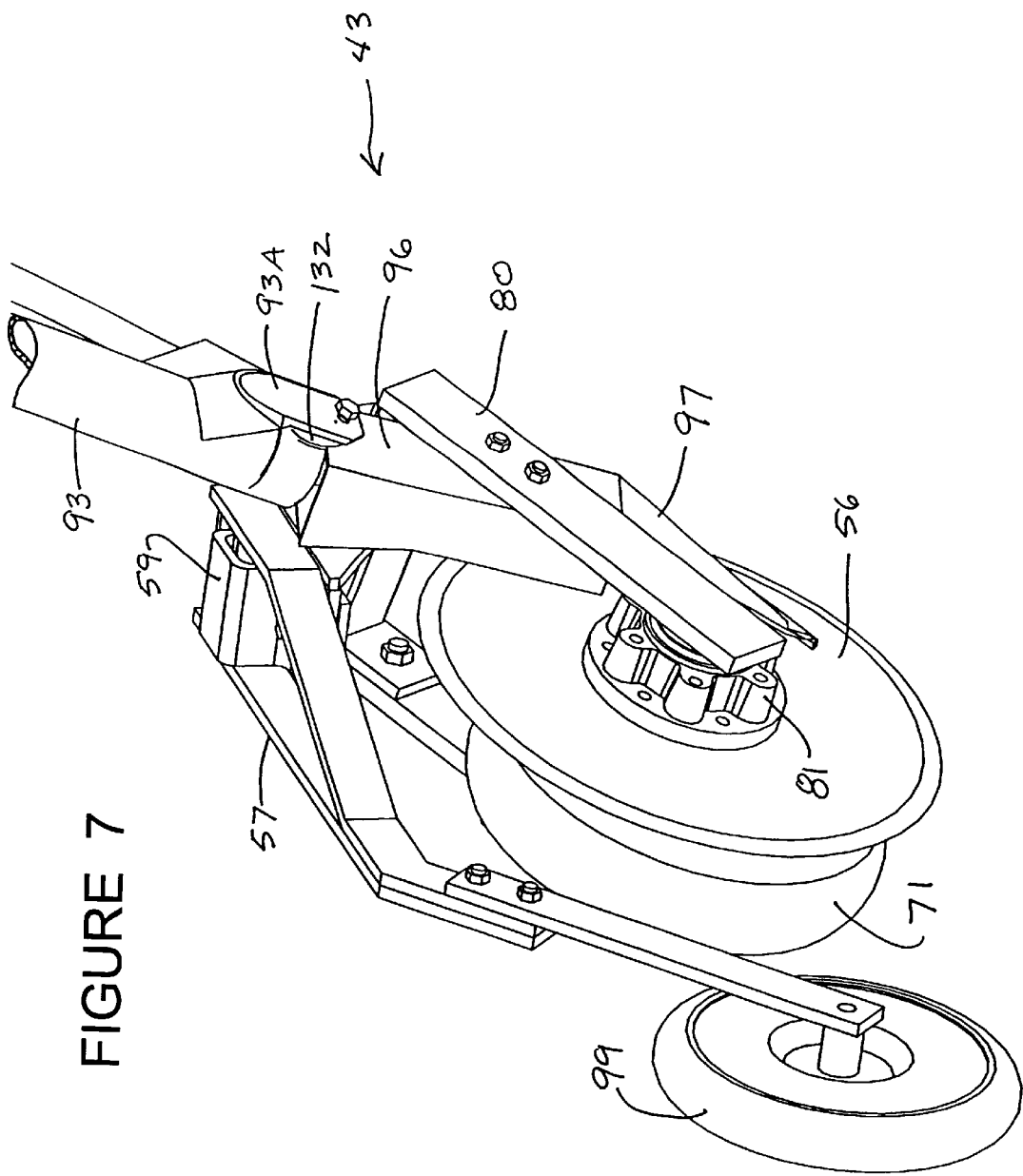
FIG. 7 is an enlarged perspective view of planting equipment of the planter assembly of FIG. 5 viewed from the opposite side thereof.

The lower seed tube section 93 is rotatably connected to the planting equipment at the end of the torque arm 51 by another swivel connector. The lower end of lower seed tube section 93 has a sleeve 93B that empties into a seed shoe 96. Seed shoe 96 is connected to the second yoke leg 80 between it and the surface of disk 56. A second swivel connector 132 (FIGS. 7 and 8) connects the seed shoe 96 to the lower end of the lower seed tube section 93. The second swivel connector 132 is connected as by welding to the seed shoe 96 and pivotally connects to the connector bracket 93A. A limited amount of rotational movement is permitted between the lower seed tube section 93 and the planting equipment.

By virtue of the telescoping sections, seed tube 60 is able to extend and retract or move from side to side as the need may be, as when the machine is traversing irregular terrain or when the planting assemblies are elevated for over-the-road travel. The seed tube is less susceptible to damage under such circumstances.

A seed drop funnel 97 is connected to the lower end of the seed shoe 96 and is located next to the surface of the disk 56 poised to drop seed into furrow just opened by the disk 56. The furrow opened by disk 56 is closed by press wheel 99 mounted on press wheel arm 101 connected to press wheel beam 57 in turn connected to yoke 52.

Planter assembly 43 described above is one of the aft rank of planter assemblies. Planter assemblies of the forward rank are constructed in like fashion with two exceptions. The forward planter assemblies are positioned closer to the corresponding rock shaft 31 permitting a torque arm of lighter construction. The forward planter assemblies as shown have seed tubes that include an intermediate seed tube section located between the upper and lower sections.

FIG. 6 shows a planter assembly 37 of the forward rank. The planter assembly has the same depth gauge tire 71, furrowing disk 56 and press wheel assembly 58. The planter assembly 37 is connected to the forward rock shaft 31 by a torque arm 51A. Torque arm 51A is comprised of a single main torque arm member 64A. Torque arm 51A has a length less than the torque arms 51 connecting the aft planter assemblies to the aft rock shaft 32. A seed tube 60A delivers seed from a seed bin to a location adjacent furrowing disk 56. Seed tube 60A includes an upper section 91 and a lower section 93. Upper section 91 is connected to a frame member 17 by a universal swivel connector 125. Seed tube 60A includes a middle or intermediate section 92. The lower end of upper section 91 telescopes into the top of intermediate section 92. The lower end of intermediate section 92 telescopes into the top of lower section 93. A tether or chain 130 connects intermediate section 92 to a frame member 17 to limit permissible downward movement of intermediate section 92. Intermediate section 92 provides an increased length for seed tube 60A as may be desirable or necessary according to the planter configuration.

FIG. 3 shows the torsion joint 50 connecting the planter assembly 37 to the rock shaft 32. The torsion joint is shown in greater detail in FIGS. 10 through 12. Torsion joint 50 includes square side-by-side housings 103, 103A which are alike in construction. Housing 103 includes a three-sided casing 104 closed on the fourth side by mounting plate 61. Flanges 106 on the casing 104 are connected by nut and bolt assemblies 107 to the mounting plate 61. Housing 103 has a generally square interior and is mounted in diagonal relationship to the cross-section of rock shaft 32. The interior corners of housing 103 are rounded and face flat surfaces of rock shaft 32. The interior corners of housing 103 are filled with torsion spring elements 108–111 that are closely lodged between the interior corners and a corresponding flat side surface of rock shaft 32. Each torsion spring element is formed of a strong resilient plastic or rubber or equivalent material deflectable under load. A flexible elastomer material type material such as urethane, neoprene, butyl or similar material can be chosen for characteristics of resiliency, high compression strength and resistance to outdoor elements. Spring elements 108–111 span the length of housing 103.

Figure 11:
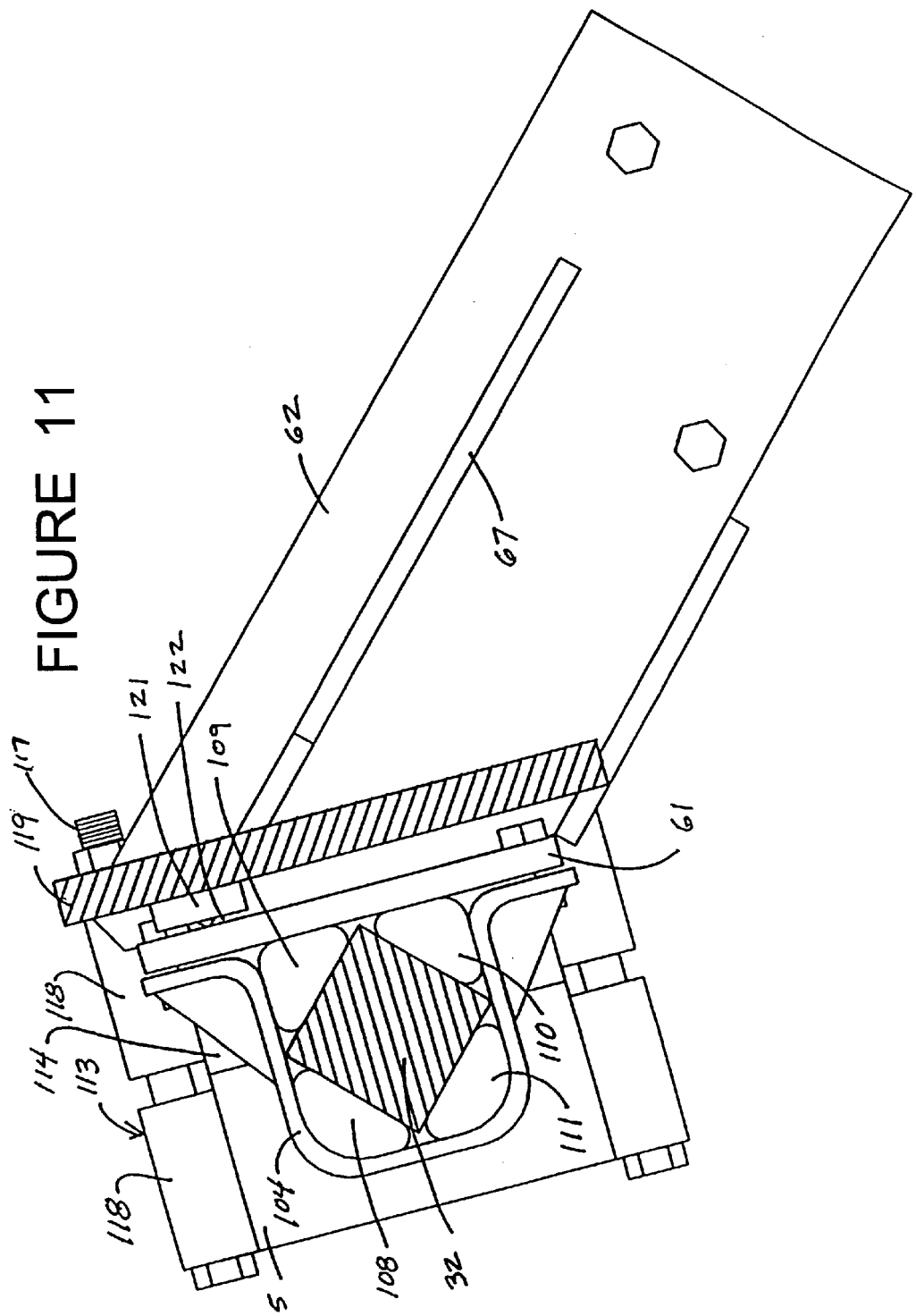
FIG. 11 is a side sectional view of the torsion joint assembly of FIG. 10 taken along the line 11—11 thereof.

Joint 50 accommodates up and down deflection of torque arm 51 through the torsion spring elements 108–111. Permissible rotation of the joint is limited by a stop block assembly 113 mounted next to the housing 103 on rock shaft 32. Stop block assembly 113 includes first and second block sections 114, 115 assembled to rock shaft 32. Sections 114, 115 are connected by bolts 117 (FIG. 11) engaged in cylindrical bosses 118 attached to the half sections 114, 115. First half section 114 extends beyond the mounting plate 61 of housing 103. This relationship is shown in FIG. 11. A stop plate 119 is connected to the outside edge of first half section 114. Stop plate 119 extends laterally inward toward the torque arm 51 where it overlaps with the mounting plate 61 and is normally spaced from it. Stop plate 119 has a shoulder 121 attached to it. Shoulder 121 faces mounting plate 61. Under most normal working conditions, there is a gap between shoulder 121 and mounting plate 61. This gap is indicated at 122 in FIG. 11.

Stop plate 119 and mounting plate 61 are in overlapping and normally spaced apart relationship on the rock shaft such that rotational movement of the torsion joint on the rock shaft tends to bring the mounting plate and stop plate into intercepting relationship whereby further rotation of the torsion joint on the rock shaft is prohibited.

A second stop block assembly 113A is fastened to the rock shaft 32 outboard of the second torsion joint housing 103A.

Figure 12:
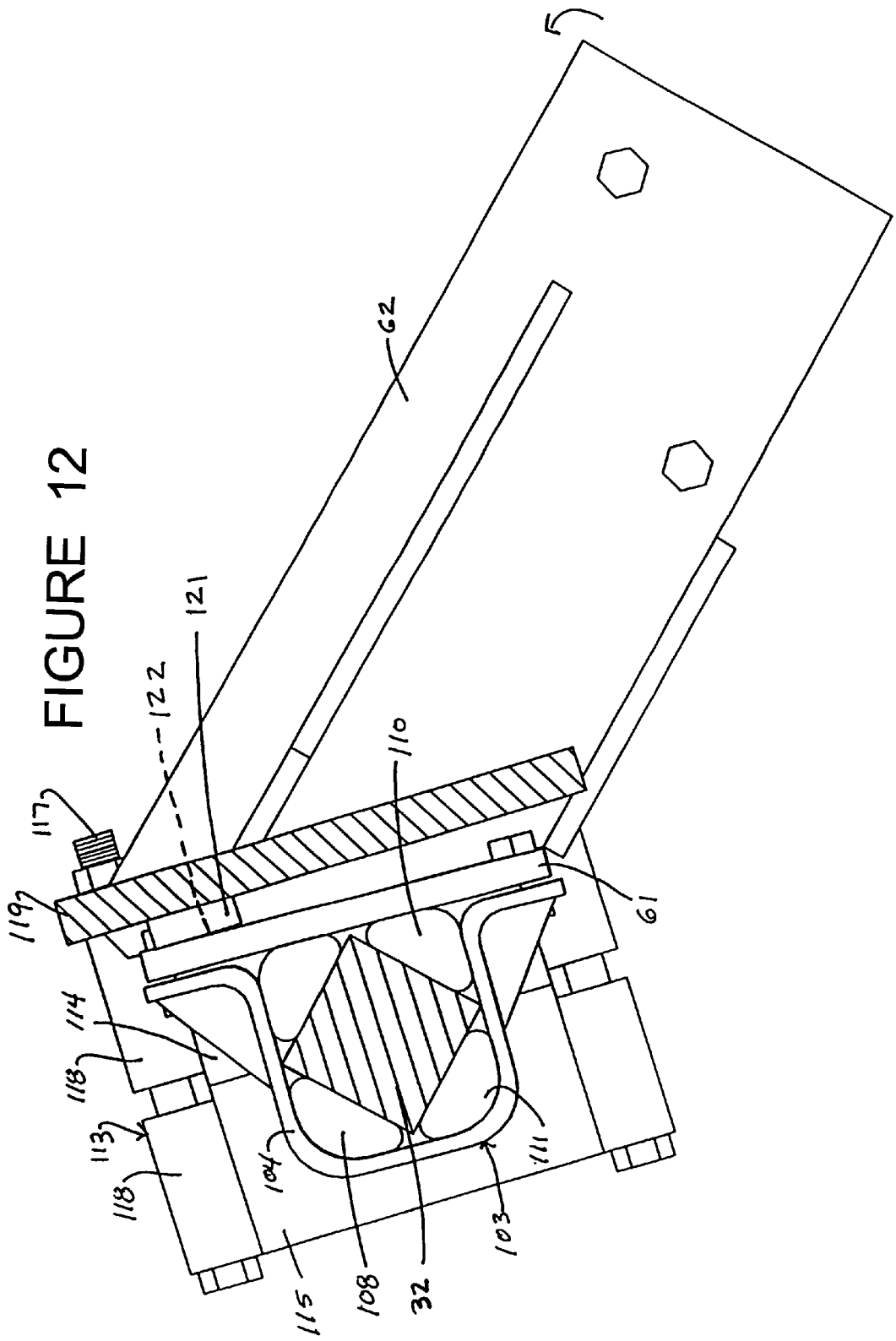
FIG. 12 is a view like that of FIG. 11 but showing the torsion knuckle assembly deflected on the rock shaft.

FIG. 11 shows the torsion joint 50 holding the torque arm 51 in a working position as when the planting equipment is engaged in the soil being planted. Up and down deflection is accommodated by the torsion spring elements 108–111 which impart a return force to the torque arm. FIG. 12 shows the spring elements 108–111 in a state of deflection. From time to time an extreme deflection condition will be encountered, such as a large obstacle, or when the rock shaft 32 is rotated by the hydraulic motor 36 in order to lift the planter assemblies for transport or storage. The amount of permissible deflection is limited by the stop block assembly 113. Stop block assembly 113 is stationary on rock shaft 32.

As shown in FIG. 12, rotation of torque arm 51 on rock shaft 32 is limited by shoulder 121. When the limit of permissible of rotation is reached, shoulder 121 intercepts mounting plate 61 of torsion joint 50. FIG. 12 shows the gap 122 closed between mounting plate 61 and shoulder 121 and the two are in contact. Beyond this point, stop block assembly 113 bears the weight of the planter assembly upon further rotation of rock shaft 32. This keeps the joint 50 from moving over-center or dislodging on the rock shaft, and prevents damage and permanent deformation to the spring elements.

The embodiments of the invention in which an exclusive property or privilege is claimed are defined as follows:

1. A seed planter comprising:
   a wheel mounted frame for movement over soil to be planted;
   at least one seed box mounted on the frame;
   at least one rock shaft mounted laterally across the frame;
   a plurality of seed planter assemblies connected to the rock shaft;
   said seed box having seed outlet openings corresponding to the seed planter assemblies;
   each seed planter assembly including a torsion joint connected to the rock shaft, a torque arm connected at an upper end to the torsion joint for limited rotational movement of the torque arm on the rock shaft in a generally vertical plane, and planting equipment assembled to a lower end of the torque arm;
   said planting equipment including a yoke connected to the torque arm at the end opposite the torsion joint;
   said yoke having first and second spaced apart legs;
   said first leg carrying a depth gauge wheel assembly;
   said second leg carrying a furrowing disk;
   said depth gauge wheel assembly including an axle support plate structure connected to the first leg;
   an axle having an outboard section adjustably connected to the axle support plate structure in a manner permitting lateral adjustment of the axle with respect to the axle support plate structure;
   said axle having an inboard section carrying a depth gauge wheel including a wheel hub rotatably connected to the axle, and a depth gauge tire connected to the hub;
   said first and second yoke legs positioning the depth gauge wheel and furrowing disk in generally parallel, facing spaced-apart relationship;
   a flexible boot attached to a side surface of the depth gauge tire facing the furrowing disk and extending toward a side surface of the furrowing disk with an outboard boot edge for location next to a side surface of the furrowing disk in order to inhibit soil accumulation on the side of the disk;
   means for in-and-out adjustment of the axle position in order to vary the spacing between the depth gauge tire and the furrowing disk;
   a plurality of seed tubes corresponding to the plurality of seed planter assemblies, each seed tube mounted to the frame with an upper end located in position to receive seed from a seed outlet of the seed box, and a lower end positioned next to a furrowing disk to drop seed into a furrow just opened by the furrowing disk.

2. The seed planter of claim 1 wherein:
   said torque arm includes a main member and leaf members.

3. The seed planter of claim 1 wherein:
   said torque arm includes a main member connected to the frame at an upper end and connected to planting equipment at a lower end;
   a first leaf member positioned in adjacent relationship to the main member, fixed at an upper end to the frame and having a lower free end terminating intermediate along the length of the main member to buffer side to side deflection of the main member.

4. The seed planter of claim 3 including:
   a second leaf member positioned in adjacent relationship to the main member.

5. The seed planter of claim 4 including:
   an open ended box-like housing encompassing a portion of the lower end of the main member and the free ends of the leaf members to hold the free ends of the leaf members close to the main member and constrain them for side-to-side deflection together.

6. The seed planter of claim 4 wherein:
   said torsion joint includes a torsion joint housing connected to the rock shaft with said torque arm connected to the torsion joint housing;
   said torsion joint housing having a mounting plate;
   a stop block assembly connected to the rock shaft next to the torsion joint housing in order to limit permissible rotational movement of the torsion joint housing on the rock shaft;
   said stop block assembly including a stop plate;
   said stop plate and mounting plate positioned to be in overlapping and normally spaced apart relationship on the rock shaft such that rotational movement of the torsion joint on the rock shaft tends to bring the mounting plate and stop plate into intercepting relationship whereby further rotation of the torsion joint on the rock shaft is prohibited.

7. The seed planter of claim 6 wherein:
said torsion joint includes a plurality of torsion joint elements lodged between interior surfaces of the torsion joint housing and the rock shaft.

8. The seed planter of claim 6 wherein:
said seed tube has telescoping sections so as to be adjustable in length.

9. The seed planter of claim 6 wherein:
said seed tube has three telescopically connected sections so as to be adjustable in length, including an upper section, a middle section and a lower section;
said upper section pivotally connected to the frame with an upper end located proximate a seed box outlet opening to receive seed from the seed box;
said middle section connected by a tether to the frame to limit downward movement of the middle section relative to the upper section;
said lower section pivotally connected to the planting equipment for movement with the planting equipment upon rotation of the torque arm on relative to the rock shaft.

10. The seed planter of claim 9 including:
a second rock shaft laterally mounted across the frame longitudinally spaced from the first rock shaft;
a second plurality of planter assemblies connected to the second rock shaft;
a second seed box having seed outlet openings corresponding to the second plurality of seed planter assemblies;
a second plurality of seed tubes corresponding to the second plurality of planter assemblies.

11. The seed planter of claim 1 wherein:
said torsion joint includes a torsion joint housing connected to the rock shaft with said torque arm connected to the torsion joint housing;
said torsion joint housing having a mounting plate;
a stop block assembly connected to the rock shaft next to the torsion joint housing in order to limit permissible rotational movement of the torsion joint housing on the rock shaft;
said stop block assembly including a stop plate;
said stop plate and mounting plate positioned to be in overlapping and normally spaced apart relationship on the rock shaft such that rotational movement of the torsion joint on the rock shaft tends to bring the mounting plate and stop plate into intercepting relationship whereby further rotation of the torsion joint on the rock shaft is prohibited.

12. The seed planter of claim 11 wherein:
said seed tubes have telescoping sections so as to be adjustable in length.

13. The seed planter of claim 11 wherein:
at least one of said seed tubes has two telescopically connected sections so as to be adjustable in length, including an upper section and a lower section;
said upper section pivotally connected to the frame with an upper end located proximate a seed box outlet opening to receive seed from the seed box;
said lower section pivotally connected to the planting equipment for movement with the planting equipment upon rotation of the torque arm on relative to the rock shaft.

14. The seed planter of claim 11 wherein:
at least one of said seed tubes has three telescopically connected sections so as to be adjustable in length, including an upper section, a middle section and a lower section;
said upper section pivotally connected to the frame with an upper end located proximate a seed box outlet opening to receive seed from the seed box;
said middle section connected by a tether to the frame to limit downward movement of the middle section relative to the upper section;
said lower section pivotally connected to the planting equipment for movement with the planting equipment upon rotation of the torque arm on relative to the rock shaft.

15. The seed planter of claim 13 including:
a second rock shaft laterally mounted across the frame longitudinally spaced from the first rock shaft;
a second plurality of planter assemblies connected to the second rock shaft;
said seed box having seed outlet openings corresponding to the second plurality of seed planter assemblies;
a second plurality of seed tubes corresponding to the second plurality of planter assemblies.

16. The seed planter of claim 1 wherein:
said seed tubes have telescoping sections so as to be adjustable in length.

17. The seed planter of claim 1 wherein:
at least one of said seed tubes has two telescopically connected sections so as to be adjustable in length, including an upper section and a lower section;
said upper section pivotally connected to the frame with an upper end located proximate a seed box outlet opening to receive seed from the seed box;
said lower section pivotally connected to the planting equipment for movement with the planting equipment upon rotation of the torque arm on relative to the rock shaft.

18. The seed planter of claim 17 including:
a second rock shaft laterally mounted across the frame longitudinally spaced from the first rock shaft;
a second plurality of planter assemblies connected to the second rock shaft;
said seed box having seed outlet openings corresponding to the second plurality of seed planter assemblies;
a second plurality of seed tubes corresponding to the second plurality of planter assemblies.

19. The seed planter of claim 1 wherein:
said seed tube has three telescopically connected sections so as to be adjustable in length, including an upper section, a middle section and a lower section;
said upper section pivotally connected to the frame with an upper end located proximate a seed box outlet opening to receive seed from the seed box;
said middle section connected by a tether to the frame to limit downward movement of the middle section relative to the upper section;
said lower section pivotally connected to the planting equipment for movement with the planting equipment upon rotation of the torque arm on relative to the rock shaft.

20. The seed planter of claim 1 wherein:
said means for adjustment of the in-and-out position of the axle includes a shoulder on the axle between the axle support plate structure and the wheel hub;
one or more spacers that can be installed on the axle between the axle support plate structure and the shoulder for adjustment of the in-and-out position of the axle in order to vary the spacing between the depth gauge tire and the furrowing disk.

21. The seed planter of claim 1 wherein:

said means for adjustment of the in-and-out position of the axle includes said axle having said outboard section threaded;

said support plate structure including a side plate with a threaded opening corresponding to the threaded axle outboard section;

said axle threaded into the threaded opening of the side plate an adjustable distance to vary the spacing between the depth gauge tire and the furrowing disk.

22. A seed planter comprising:

a wheel mounted frame for movement over soil to be planted;

at least one seed box mounted on the frame;

at least one rock shaft mounted laterally across the frame;

a plurality of seed planter assemblies connected to the rock shaft;

said seed box having seed outlet openings corresponding to the number of seed planter assemblies;

each seed planter assembly including a torsion joint connected to the rock shaft, a torque arm connected at an upper end to the torsion joint for limited rotational movement of the torque arm on the rock shaft in a generally vertical plane, and planting equipment assembled to a lower end of the torque arm;

said planting equipment including a furrowing disk;

a plurality of seed tubes corresponding to the plurality of seed planter assemblies, each seed tube mounted to the frame with an upper end located in position to receive seed from a seed outlet of the seed box, and a lower end positioned next to a furrowing disk to drop seed into a furrow just opened by the furrowing disk;

said torque arm including a main member connected to the frame at an upper end and connected to planting equipment at a lower end;

first and second leaf spring members positioned in adjacent relationship to the main member, fixed at upper ends to the frame and having lower free ends terminating intermediate along the length of the main member to buffer side to side deflection of the main member;

an open ended box-like housing encompassing a portion of the lower end of the main member and the free ends of the leaf members to hold the free ends of the leaf members close to the main member and constrain them for side-to-side deflection together.

23. The seed planter of claim 22 wherein:

said torsion joint includes a torsion joint housing connected to the rock shaft with said torque arm connected to the torsion joint housing;

said torsion joint housing having a mounting plate;

a stop block assembly connected to the rock shaft next to the torsion joint housing in order to limit permissible rotational movement of the torsion joint housing on the rock shaft;

said stop block assembly including a stop plate;

said stop plate and mounting plate positioned to be in overlapping and normally spaced apart relationship on the rock shaft such that rotational movement of the torsion joint on the rock shaft tends to bring the mounting plate and stop plate into intercepting relationship whereby further rotation of the torsion joint on the rock shaft is prohibited.

24. The seed planter of claim 23 wherein:

said torsion joint includes a plurality of torsion joint elements lodged between interior surfaces of the torsion joint housing and the rock shaft.

25. The seed planter of claim 23 including:

a second rock shaft laterally mounted across the frame longitudinally spaced from the first rock shaft;

a second plurality of planter assemblies connected to the second rock shaft;

said seed box having seed outlet openings corresponding to the second plurality of seed planter assemblies;

a second plurality of seed tubes corresponding to the second plurality of planter assemblies.

26. A seed planter comprising:

a wheel mounted frame for movement over soil to be planted;

at least one seed box mounted on the frame;

at least one rock shaft mounted laterally across the frame;

a plurality of seed planter assemblies connected to the rock shaft;

said seed box having seed outlet openings corresponding to the seed planter assemblies;

each seed planter assembly including a torsion joint connected to the rock shaft, a torque arm connected at an upper end to the torsion joint for limited rotational movement of the torque arm on the rock shaft in a generally vertical plane, and planting equipment assembled to a lower end of the torque arm;

said torsion joint including a torsion joint housing connected to the rock shaft with said torque arm connected to the torsion joint housing;

said torsion joint housing having a mounting plate;

a stop block assembly connected to the rock shaft next to the torsion joint housing in order to limit permissible rotational movement of the torsion joint housing on the rock shaft;

said stop block assembly including a stop plate;

said stop plate and mounting plate positioned to be in overlapping and normally spaced apart relationship on the rock shaft such that rotational movement of the torsion joint on the rock shaft tends to bring the mounting plate and stop plate into intercepting relationship whereby further rotation of the torsion joint on the rock shaft is prohibited;

said planting equipment including a furrowing disk;

a plurality of seed tubes corresponding to the plurality of seed planter assemblies, each seed tube mounted to the frame with an upper end located in position to receive seed from a seed outlet of the seed box, and a lower end positioned next to a furrowing disk to drop seed into a furrow just opened by the furrowing disk.

27. The seed planter of claim 26 wherein:

said torsion joint includes a plurality of torsion joint elements lodged between interior surfaces of the torsion joint housing and the rock shaft.

28. The seed planter of claim 26 wherein:

said seed tubes have telescoping sections so as to be adjustable in length.

29. The seed planter of claim 26 wherein:

at least one of said seed tubes has two telescopically connected sections so as to be adjustable in length, including an upper section and a lower section;

said upper section pivotally connected to the frame with an upper end located proximate a seed box outlet opening to receive seed from the seed box;

said lower section pivotally connected to the planting equipment for movement with the planting equipment upon rotation of the torque arm on relative to the rock shaft.

30. The seed planter of claim 29 including:

a second rock shaft laterally mounted across the frame longitudinally spaced from the first rock shaft;

a second plurality of planter assemblies connected to the second rock shaft;

said seed box having seed outlet openings corresponding to the second plurality of seed planter assemblies;

a second plurality of seed tubes corresponding to the second plurality of planter assemblies.

31. The seed planter of claim 26 wherein:

at least one of said seed tubes has three telescopically connected sections so as to be adjustable in length, including an upper section, a middle section and a lower section;

said upper section pivotally connected to the frame with an upper end located proximate a seed box outlet opening to receive seed from the seed box;

said middle section connected by a tether to the frame to limit downward movement of the middle section relative to the upper section;

said lower section pivotally connected to the planting equipment for movement with the planting equipment upon rotation of the torque arm on relative to the rock shaft.

32. A seed planter comprising:

a wheel mounted frame for movement over soil to be planted;

at least one seed box mounted laterally across the frame;

at least one rock shaft mounted across the frame;

a plurality of seed planter assemblies connected to the rock shaft;

said seed box having seed outlet openings corresponding to the seed planter assemblies;

each seed planter assembly including a torsion joint connected to the rock shaft, a torque arm connected at an upper end to the torsion joint for limited rotational movement of the torque arm on the rock shaft in a generally vertical plane, and planting equipment assembled to a lower end of the torque arm;

said planting equipment including a furrowing disk;

a plurality of seed tubes corresponding to the plurality of seed planter assemblies, each seed tube mounted to the frame with an upper end located in position to receive seed from a seed outlet of the seed box, and a lower end positioned next to a furrowing disk to drop seed into a furrow just opened by the furrowing disk;

said seed tube having three telescopically connected sections so as to be adjustable in length, including an upper section, a middle section and a lower section;

said upper section pivotally connected to the frame with an upper end located proximate a seed box outlet opening to receive seed from the seed box;

said middle section connected by a tether to the frame to limit downward movement of the middle section relative to the upper section;

said lower section pivotally connected to the planting equipment for movement with the planting equipment upon rotation of the torque arm relative to the rock shaft.

33. The seed planter of claim 32 including:

a second rock shaft laterally mounted across the frame longitudinally spaced from the first rock shaft;

a second plurality of planter assemblies connected to the second rock shaft;

said seed box having seed outlet openings corresponding to the second plurality of seed planter assemblies;

a second plurality of seed tubes corresponding to the second plurality of planter assemblies.

\* \* \* \* \*